(12) United States Patent
Richards et al.

(10) Patent No.: US 6,469,628 B1
(45) Date of Patent: Oct. 22, 2002

(54) SYSTEM AND METHOD FOR USING IMPULSE RADIO TECHNOLOGY IN THE FARMING FIELD

(75) Inventors: James L. Richards, Fayetteville, TN (US); Larry W. Fullerton, Brownsboro, AL (US); Donald A. Kelly, Niceville, FL (US); David C. Meigs, Huntsville, AL (US); Timothy T. Payment, Huntsville, AL (US); James S. Finn, Huntsville, AL (US); William J. Tucker, Dallas, TX (US); William D. Welch, Jr., Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/710,075

(22) Filed: Nov. 10, 2000

Related U.S. Application Data

(63) Continuation-in-part of application No. 09/456,409, filed on Dec. 8, 1999, now Pat. No. 6,300,903, and a continuation-in-part of application No. 09/407,106, filed on Sep. 27, 1999, which is a continuation-in-part of application No. 09/045,929, filed on Mar. 23, 1998, now Pat. No. 6,133,876.

(51) Int. Cl.$^7$ .............................................. G08B 23/00
(52) U.S. Cl. .............................. 340/573.3; 340/573.4; 340/539
(58) Field of Search .......................... 340/539, 572.8, 340/572.9, 573.1, 573.3, 573.4, 573.7, 991

(56) References Cited

U.S. PATENT DOCUMENTS

| | | | |
|---|---|---|---|
| 4,641,317 A | 2/1987 | Fullerton | 375/130 |
| 4,743,906 A | 5/1988 | Fullerton | 342/27 |
| 4,813,057 A | 3/1989 | Fullerton | 375/259 |
| 4,979,186 A | 12/1990 | Fullerton | 375/239 |
| 5,363,108 A | 11/1994 | Fullerton | 342/27 |
| 5,467,271 A | 11/1995 | Abel et al. | 702/5 |
| 5,485,161 A | 1/1996 | Vaughn | 342/357.13 |
| 5,526,357 A * | 6/1996 | Jandrell | 340/991 |
| 5,677,927 A * | 10/1997 | Fullerton et al. | 375/200 |
| 5,687,169 A | 11/1997 | Fullerton | 370/324 |
| 5,712,782 A | 1/1998 | Weigelt et al. | 701/50 |
| 5,721,679 A | 2/1998 | Monson | 701/207 |
| 5,740,038 A | 4/1998 | Hergert | 700/284 |
| 5,791,294 A * | 8/1998 | Manning | 119/721 |
| 5,832,035 A | 11/1998 | Fullerton | 375/149 |
| 5,884,198 A * | 3/1999 | Kese et al. | 455/575 |
| 5,911,669 A | 6/1999 | Stentz et al. | 56/10.2 F |
| 5,995,895 A | 11/1999 | Watt et al. | 701/50 |
| 6,062,125 A * | 2/2000 | Larrick, Jr. et al. | 375/295 |
| 6,052,647 A | 4/2000 | Parkinson et al. | 701/215 |
| 6,058,351 A | 5/2000 | McCauley | 702/5 |
| 6,133,876 A * | 10/2000 | Fullerton et al. | 342/375 |
| 6,208,248 B1 * | 3/2001 | Ross | 340/552 |

* cited by examiner

Primary Examiner—Van Trieu
(74) Attorney, Agent, or Firm—William J. Tucker

(57) ABSTRACT

A system, electronic monitor and method are provided that utilize impulse radio technology to enable a farmer to accurately track a position of an object (e.g., farm equipment, farm animal, farm employee) as the object moves around a farm and/or to enable a farmer to monitor a variety of parameters associated with the moving farm equipment. In addition, the system, electronic monitor and method can utilize impulse radio technology to help control either remotely or automatically one or more pieces of farm equipment.

48 Claims, 20 Drawing Sheets

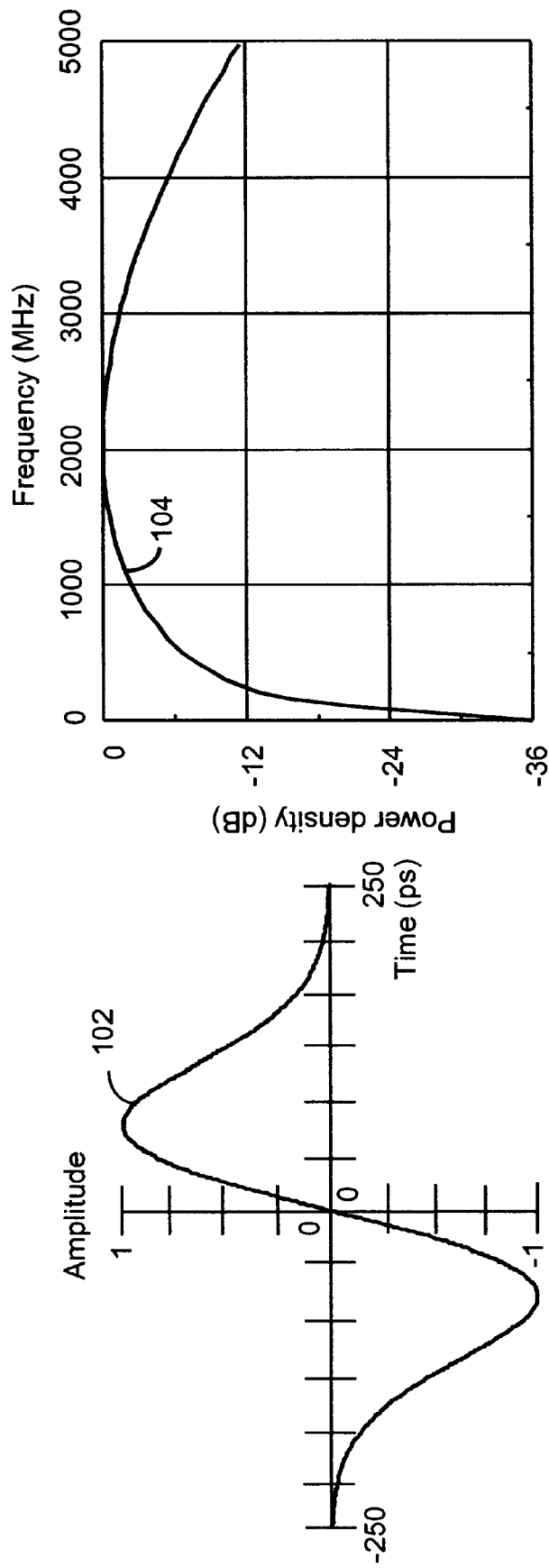

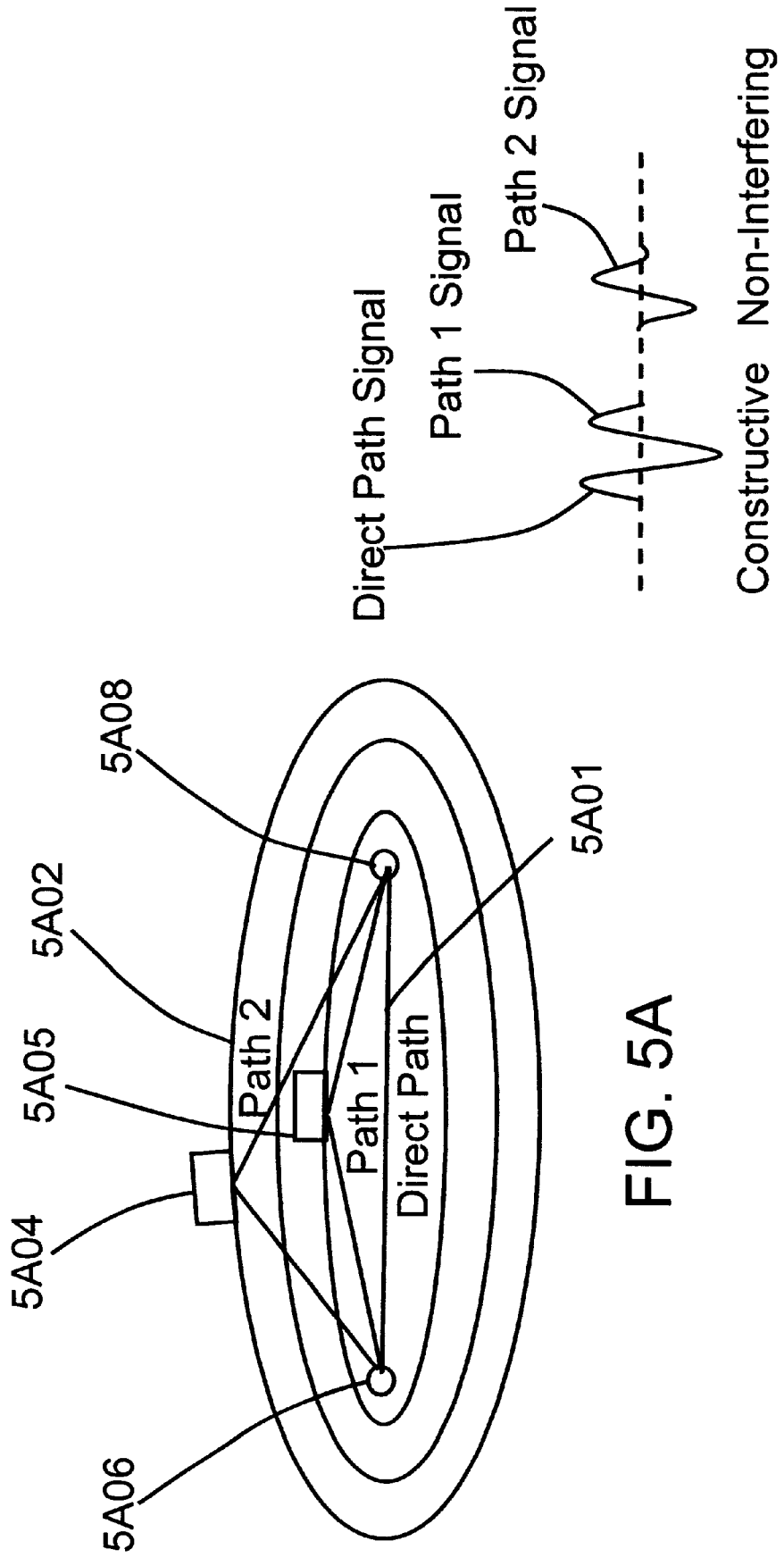

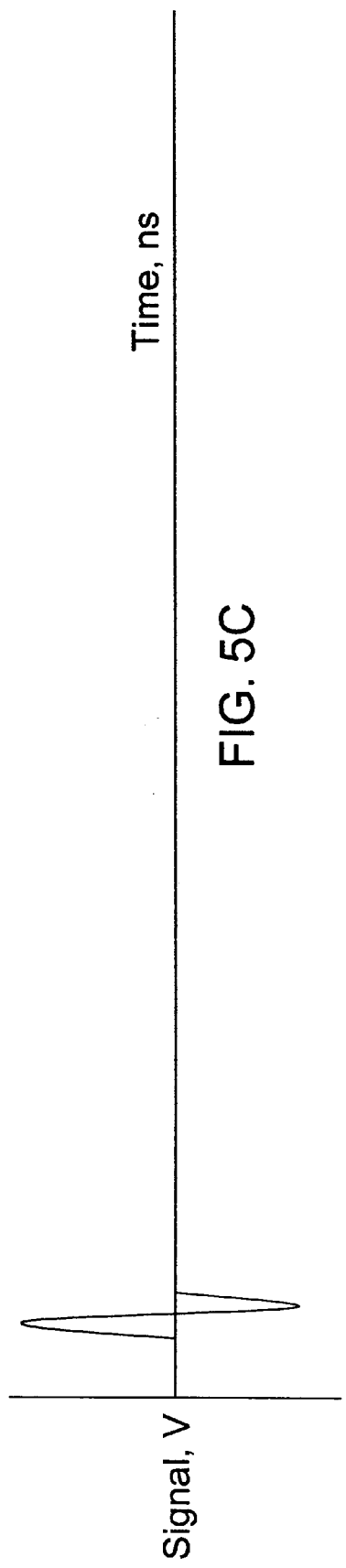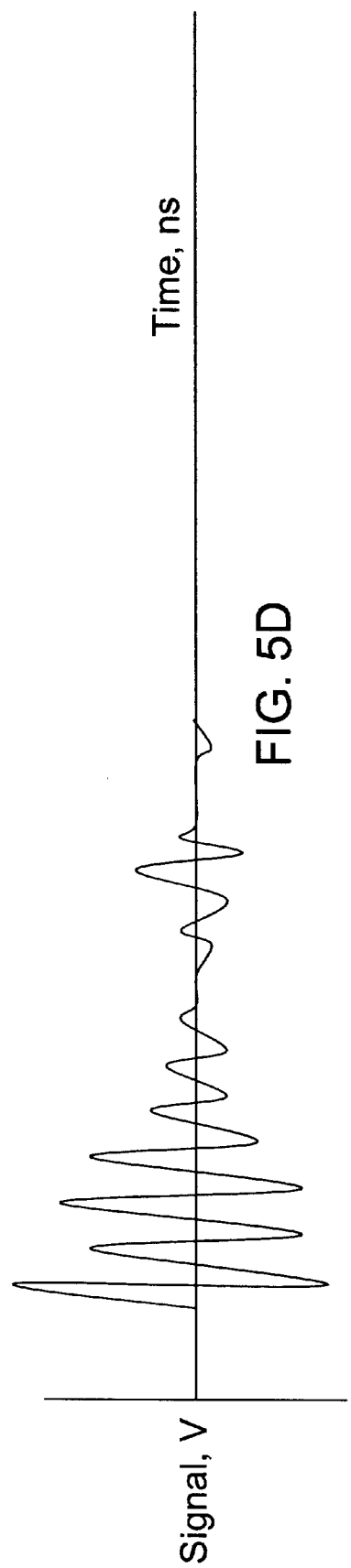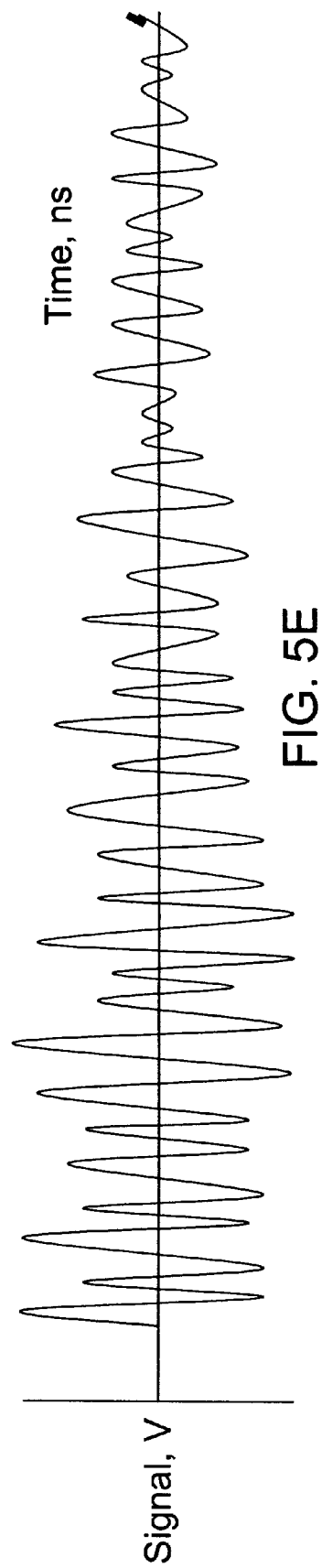
FIG. 5C
FIG. 5D
FIG. 5E

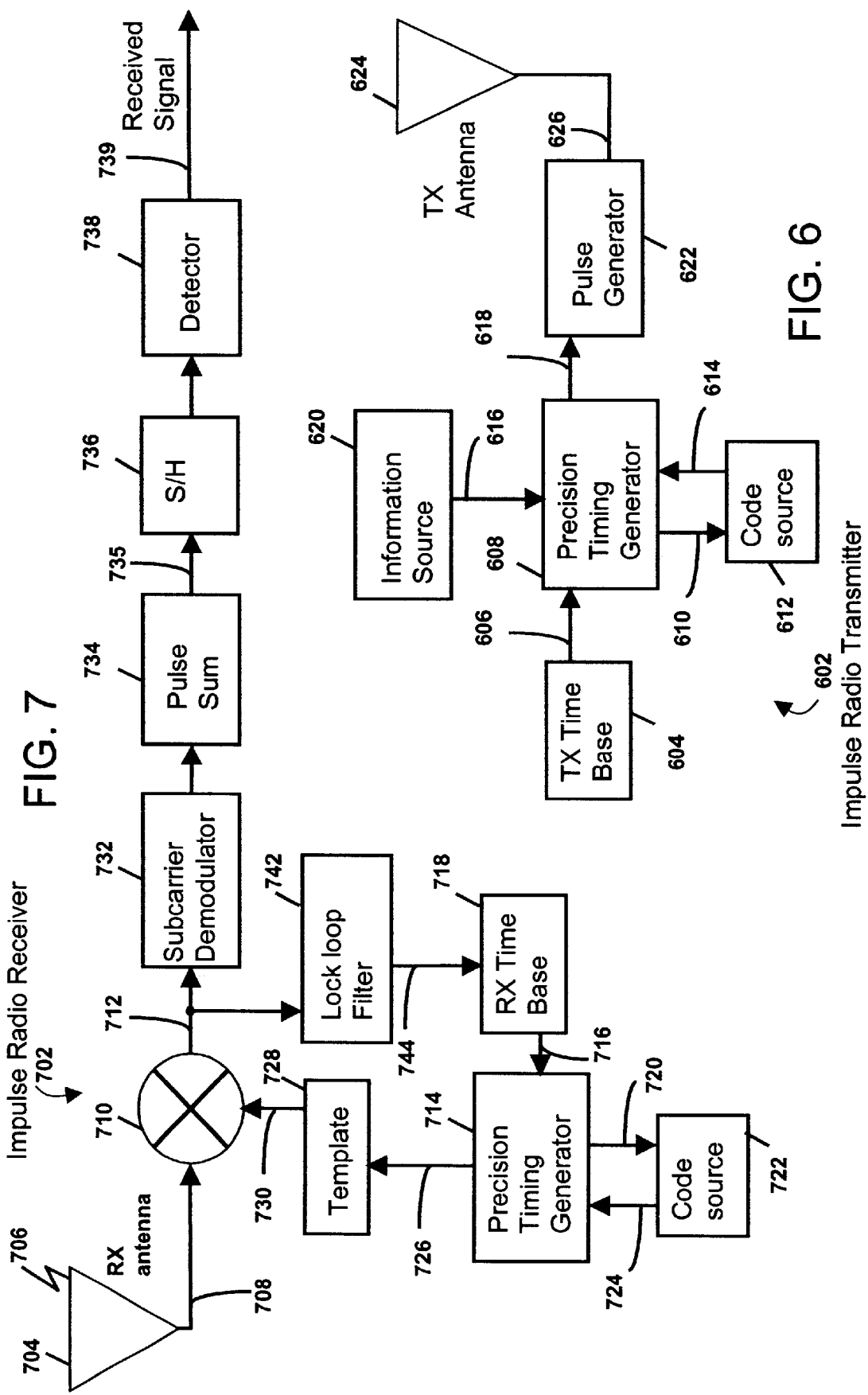

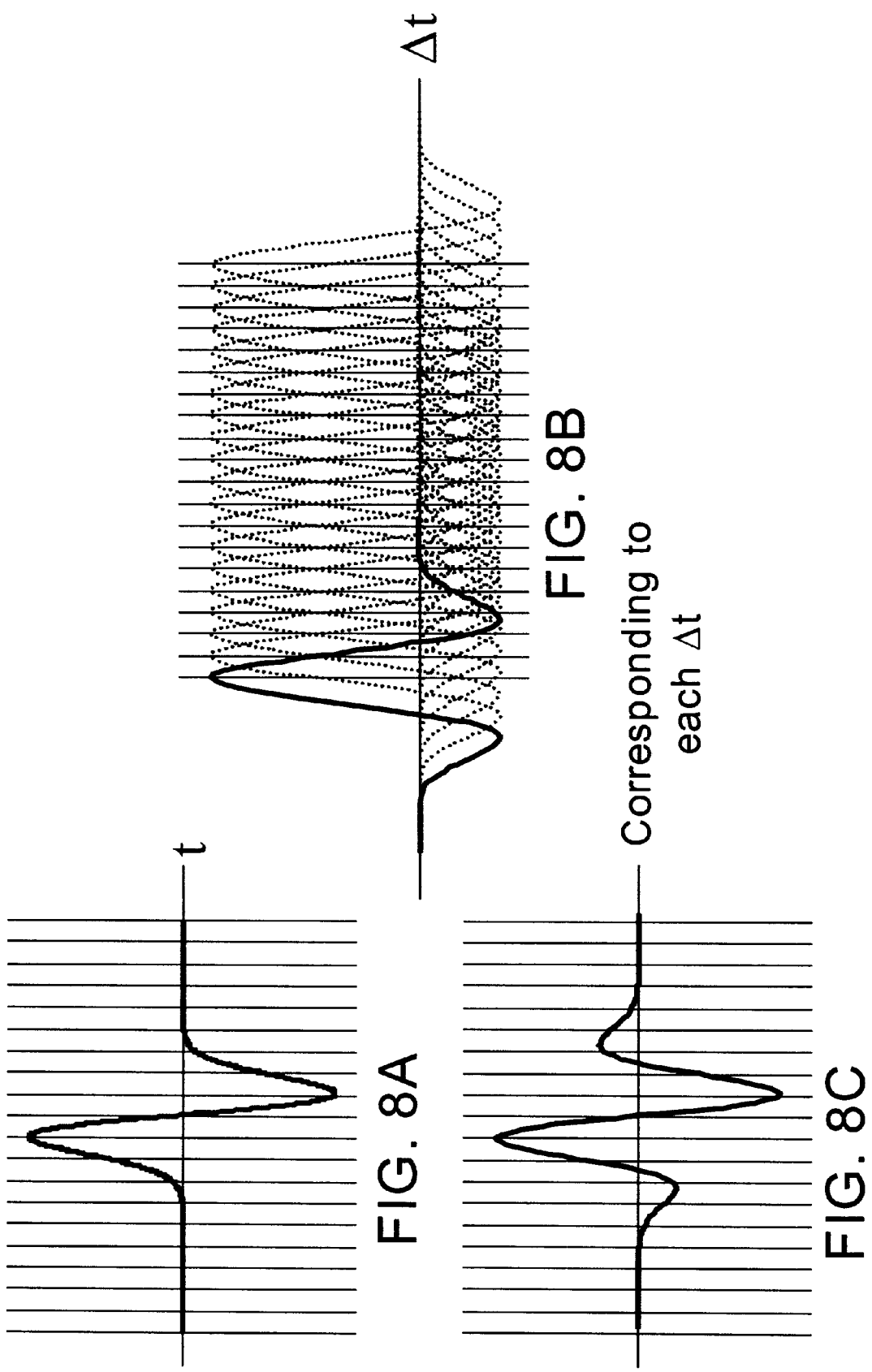

SYSTEM AND METHOD FOR USING IMPULSE RADIO TECHNOLOGY IN THE FARMING FIELD

CROSS REFERENCE TO COPENDING APPLICATIONS

This application is a Continuation-In-Part of two U.S. Applications one of which was filed on Sep. 27, 1999 and entitled "System and Method for Monitoring Assets, Objects, People and Animals Utilizing Impulse Radio" (U.S. Ser. No. 09/407,106) and the other was filed on Dec. 8, 1999 and entitled "System and Method for Person or Object Position Location Utilizing Impulse Radio" (U.S. Ser. No. 09/456,409 now U.S. Pat. No. 6,300,903) both of which are incorporated by reference herein, which is a Continuation-In-Part of U.S. Ser. No. 09/045,929, filed on Mar. 23, 1998, and now U.S. Pat. No. 6,133,876.

BACKGROUND OF THE INVENTION

1. Field of the Invention

The present invention relates in general to the farming field and, in particular, to a system, electronic monitor and method capable of using impulse radio technology to help a farmer better manage a farming operation.

2. Description of Related Art

In the farming field, one of the most significant design challenges involves the development of new ways of helping a farmer to automate or remotely operate farm equipment in an attempt to increase the productivity of a farming operation. A relatively small number of farming operations today use some sort of positioning system that enables the farmer to automate or remotely operate farm equipment such as a tractor, harvester or irrigation equipment. A vast majority of these traditional positioning systems utilize Global Positioning System (GPS) based technology.

The traditional GPS positioning system determines a "rough" approximation of the location of a particular piece of farm equipment on a farm. This "rough" approximation of the position of a piece of farm equipment can be within 5–10 meters which can lead to problems when automatically or remotely operating the farm equipment. For example, a harvester is operated most efficiently when one end of a cutter mechanism slightly overlaps a crop line between cut crop and uncut crop. If there is no overlap, an uncut strip of crop is left in the field and, on the other hand, if the overlap is to great the maximum width of crop is not cut. Of course, if the location of a remotely operated harvester is off due to the "rough" approximation of the GPS based technology, then it is likely that the harvester while either over cut or undercut the crops.

Accordingly, there is a need for a system, electronic monitor and method that can accurately track a position of a piece of farm equipment such as a tractor or harvester as it moves around a farm. In addition, there is also a need for a system, electronic monitor and method that can remotely or automatically control one or more pieces of farm equipment. These needs and other needs are solved by the system, electronic monitor and method of the present invention.

BRIEF DESCRIPTION OF THE INVENTION

The present invention includes a system, electronic monitor and method all of which utilize impulse radio technology to enable a farmer to accurately track a position of an object (e.g., farm equipment, farm animal, farm employee) as the object moves around a farm and/or to enable a farmer to monitor a variety of parameters associated with the moving farm equipment. In addition, the system, electronic monitor and method can utilize impulse radio technology to help control either remotely or automatically one or more pieces of farm equipment.

BRIEF DESCRIPTION OF THE DRAWINGS

A more complete understanding of the present invention may be had by reference to the following detailed description when taken in conjunction with the accompanying drawings wherein:

FIG. 1A illustrates a representative Gaussian Monocycle waveform in the time domain.

FIG. 1B illustrates the frequency domain amplitude of the Gaussian Monocycle of FIG. 1A.

FIG. 5A illustrates a typical geometrical configuration giving rise to multipath received signals.

FIG. 5B illustrates exemplary multipath signals in the time domain.

FIGS. 5C–5E illustrate a signal plot of various multipath environments.

FIG. 5H graphically represents signal strength as volts vs. time in a direct path and multipath environment.

FIG. 6 illustrates a representative impulse radio transmitter functional diagram.

FIG. 7 illustrates a representative impulse radio receiver functional diagram.

FIG. 8A illustrates a representative received pulse signal at the input to the correlator.

FIG. 8B illustrates a sequence of representative impulse signals in the correlation process.

FIG. 8C illustrates the output of the correlator for each of the time offsets of FIG. 8B.

DETAILED DESCRIPTION OF THE INVENTION

Figures 2A, 2B:
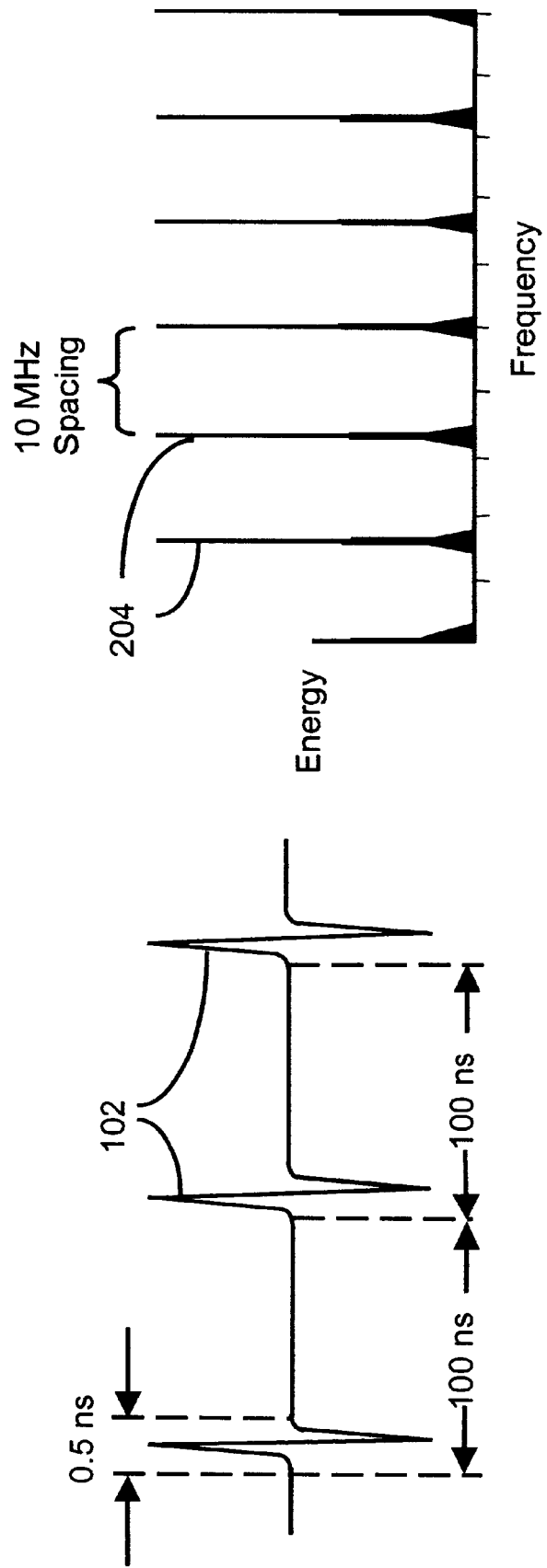
FIG. 2A illustrates a pulse train comprising pulses as in FIG. 1A.
FIG. 2B illustrates the frequency domain amplitude of the waveform of FIG. 2A.

The present invention includes a system, electronic monitor and method all of which utilize impulse radio technology to enable a farmer to accurately track a position of an object (e.g., farm equipment, farm animal, farm employee) as the object moves around a farm and/or to enable a farmer to monitor a variety of parameters associated with the moving farm equipment. In addition, the system, electronic monitor and method can utilize impulse radio technology to help control either remotely or automatically one or more pieces of farm equipment. Many of these capabilities are possible, due to the use of an emerging, revolutionary ultra wideband technology (UWB) called impulse radio technology (also known as impulse radio) which is a significant improvement over conventional radio technology and conventional GPS based technology.

Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997) and co-pending application Ser. No. 08/761,602 (filed Dec. 6, 1996) to Fullerton et al.

Uses of impulse radio systems are described in U.S. patent application Ser. No. 09/332,502, entitled, "System and Method for Intrusion Detection using a Time Domain Radar Array" and U.S. patent application Ser. No. 09/332,503, entitled, "Wide Area Time Domain Radar Array" both filed on Jun. 14, 1999 and both of which are assigned to the assignee of the present invention. These patent documents are incorporated herein by reference.

Impulse Radio Basics

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a code component. Generally, conventional spread spectrum systems employ codes to spread the normally narrow band information signal over a relatively wide band of frequencies. A conventional spread spectrum receiver correlates these signals to retrieve the original information signal. Unlike conventional spread spectrum systems, in impulse radio communications codes are not needed for energy spreading because the monocycle pulses themselves have an inherently wide bandwidth. Instead, codes are used for channelization, energy smoothing in the frequency domain, resistance to interference, and reducing the interference potential to nearby receivers.

The impulse radio receiver is typically a direct conversion receiver with a cross correlator front end which coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

The frequency domain spectrum of the above waveform is shown in FIG. 1B. The corresponding equation is:

$$F_{mono}(f) = (2\pi)3/2\sigma f e^{-2(k\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Prototypes have been built which have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to a receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by non-uniformly positioning each pulse relative to its nominal position according to a code such as a pseudo random code.

Figure 3:
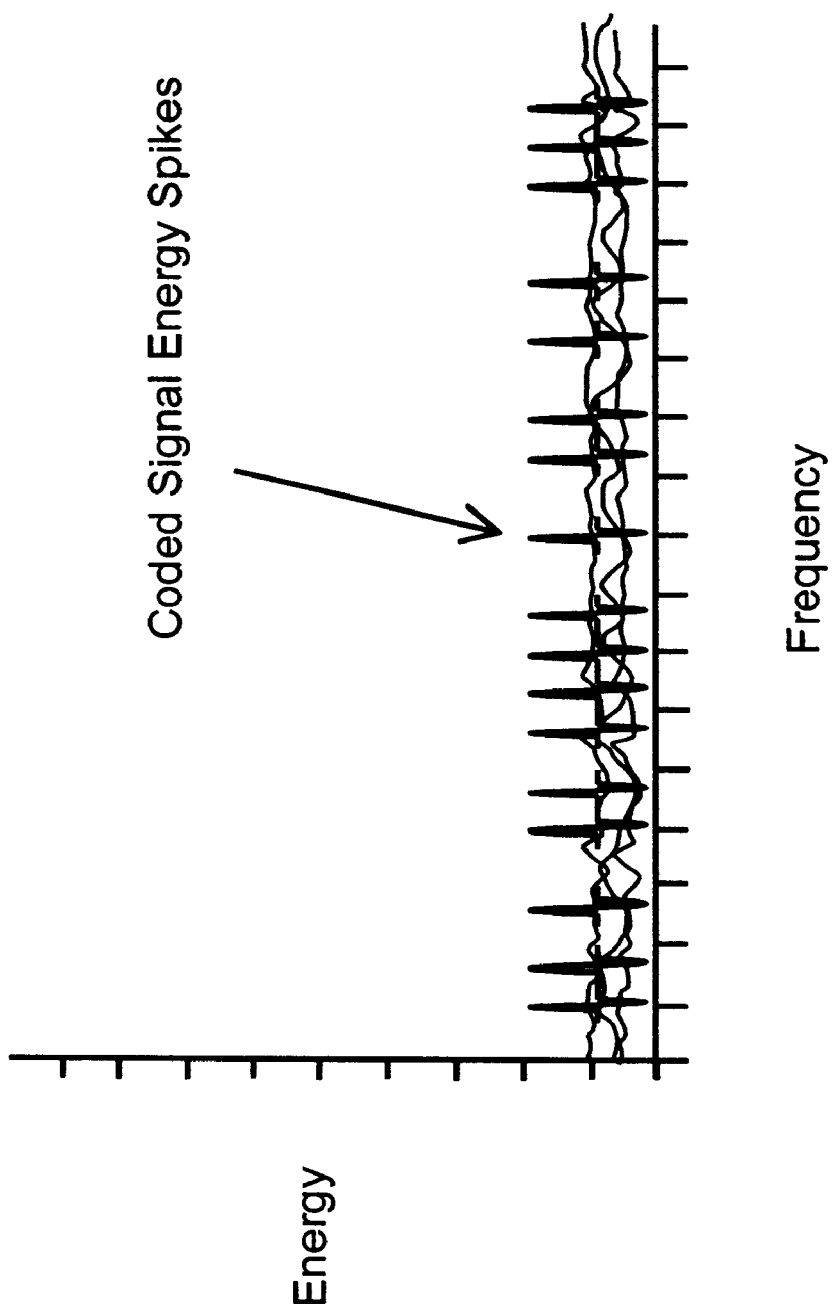
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining pseudo-random positioning for each pulse in a sequence of pulses). FIG. 3, when compared to FIG. 2B, shows that the impact of using a PN code is to destroy the comb line structure and spread the energy more uniformly. This structure typically has slight variations that are characteristic of the specific code used.

Coding also provides a method of establishing independent communication channels using impulse radio. Codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to code dither) in response to the information signal. This amount is typically very small relative to the code shift. In a 10 Mpps system with a center frequency of 2 GHz., for example, the code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The code helps impulse systems discriminate between the intended impulse transmission and interfering transmissions from others.

Figure 4:
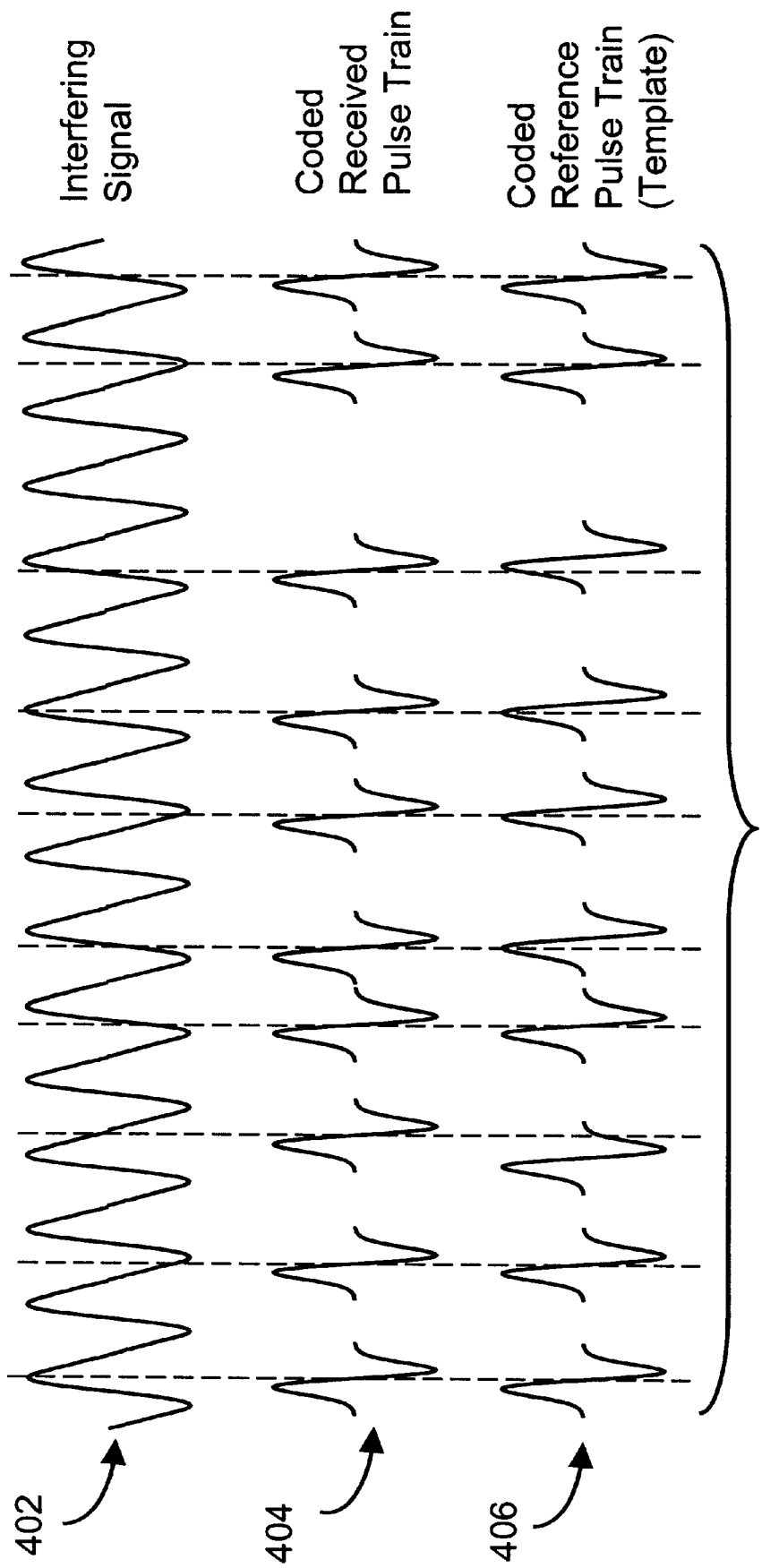
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a code dithered template signal 406. Without coding, the cross correlation would sample the interfering signal 402 with such regularity that the interfering signals could cause significant interference to the impulse radio receiver. However, when the transmitted impulse signal is encoded with the code dither (and the impulse radio receiver template signal 406 is synchronized with that identical code dither) the correlation samples the interfering signals non-uniformly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 KHz information bandwidth and a 10 MHz channel bandwidth yields a processing gain of 1000 or 30 dB. However, far greater processing gains are achieved by impulse radio systems, where the same 10 KHz information bandwidth is spread across a much greater 2 GHz channel bandwidth, resulting in a theoretical processing gain of 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V_{tot}^2$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight-line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal that propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. In this situation, the direct path signal power is small relative to the total signal power from the reflections.

An impulse radio receiver can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where r is the envelope amplitude of the combined multipath signals, and $2\sigma^2$ is the RMS power of the combined multipath signals.

Figure 5F:
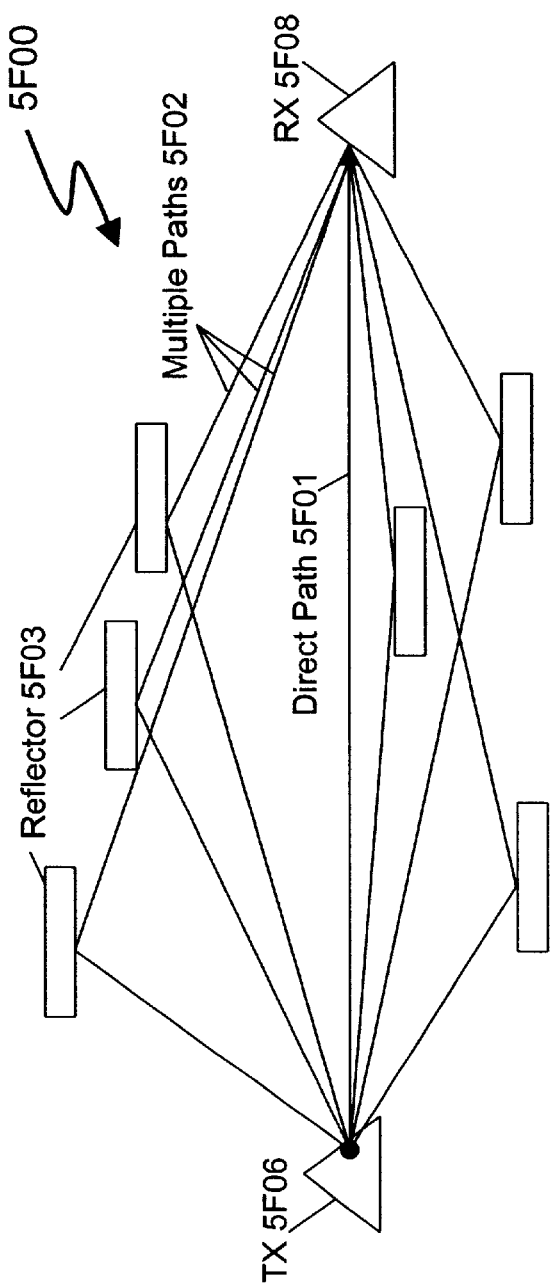
FIG. 5F illustrates a plurality of multipaths with a plurality of reflectors from a transmitter to a receiver.
Figure 5G:
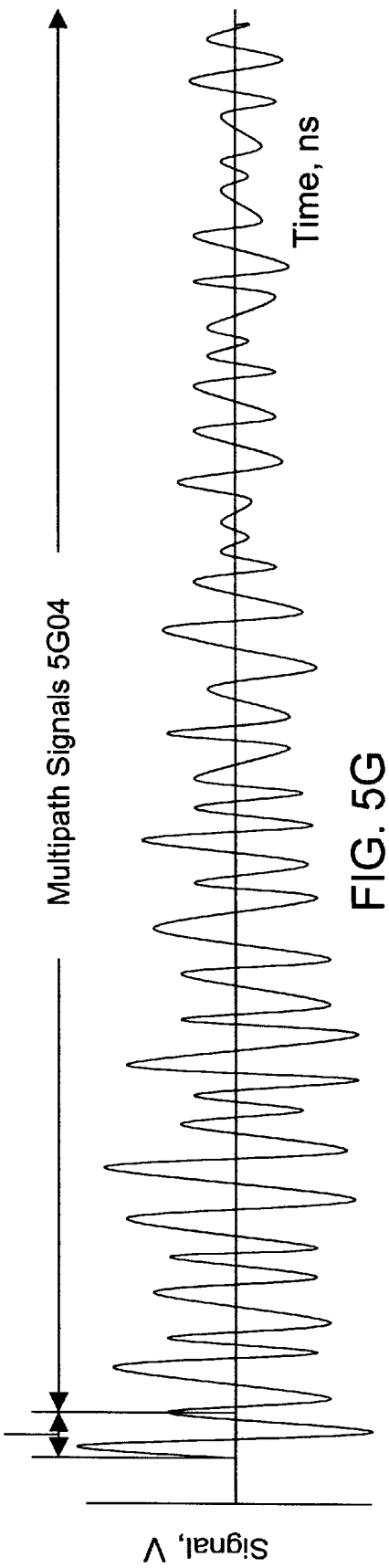
FIG. 5G graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5F and 5G in a transmit and receive system in a high multipath environment 5F00, wherein the transmitter 5F06 transmits to receiver 5F08 with the signals reflecting off reflectors 5F03 which form multipaths 5F02. The direct path is illustrated as 5F01 with the signal graphically illustrated at 5G02, with the vertical axis being the signal strength in volts and horizontal axis representing time in nanoseconds. Multipath signals are graphically illustrated at 5G04.

Distance Measurement

Important for positioning, impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method allows ranging to occur within a network of radios without the necessity of a full duplex exchange among every pair of radios.

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable codes and for outputting the PN codes as a code signal 614. Alternatively, maximum length shift registers or other computational means can be used to generate the codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph does not show a waveform that is a function of time, but rather a function of time-offset. For any given pulse received, there is only one corresponding point that is applicable on this graph. This is the point corresponding to the time offset of the template signal used to receive that pulse. Further examples and details of precision timing can be found described in U.S. Pat. No. 5,677,927, and commonly owned co-pending application No. 09/146,524, filed Sep. 3, 1998, titled "Precision Timing Generator System and Method" both of which are incorporated herein by reference.

Recent Advances in Impulse Radio Communication Modulation Techniques

To improve the placement and modulation of pulses and to find new and improved ways that those pulses transmit information, various modulation techniques have been developed. The modulation techniques articulated above as well as the recent modulation techniques invented and summarized below are incorporated herein by reference.

FLIP Modulation

An impulse radio communications system can employ FLIP modulation techniques to transmit and receive flip modulated impulse radio signals. Further, it can transmit and receive flip with shift modulated (also referred to as quadrature flip time modulated (QFTM)) impulse radio signals. Thus, FLIP modulation techniques can be used to create two, four, or more different data states.

Flip modulators include an impulse radio receiver with a time base, a precision timing generator, a template generator, a delay, first and second correlators, a data detector and a time base adjustor. The time base produces a periodic timing signal that is used by the precision timing generator to produce a timing trigger signal. The template generator uses the timing trigger signal to produce a template signal. A delay receives the template signal and outputs a delayed template signal. When an impulse radio signal is received, the first correlator correlates the received impulse radio signal with the template signal to produce a first correlator output signal, and the second correlator correlates the received impulse radio signal with the delayed template signal to produce a second correlator output signal. The data detector produces a data signal based on at least the first correlator output signal. The time base adjustor produces a time base adjustment signal based on at least the second correlator output signal. The time base adjustment signal is used to synchronize the time base with the received impulse radio signal.

For greater elaboration of FLIP modulation techniques, the reader is directed to the patent application entitled, "Apparatus, System and Method for FLIP Modulation in an Impulse Radio Communication System", Ser. No. 09/537, 692, filed Mar. 29, 2000 and assigned to the assignee of the present invention. This patent application is incorporated herein by reference.

Vector Modulation

Vector Modulation is a modulation technique which includes the steps of generating and transmitting a series of time-modulated pulses, each pulse delayed by one of four pre-determined time delay periods and representative of at least two data bits of information, and receiving and demodulating the series of time-modulated pulses to estimate the data bits associated with each pulse. The apparatus includes an impulse radio transmitter and an impulse radio receiver.

The transmitter transmits the series of time-modulated pulses and includes a transmitter time base, a time delay modulator, a code time modulator, an output stage, and a transmitting antenna. The receiver receives and demodulates the series of time-modulated pulses using a receiver time base and two correlators, one correlator designed to operate after a pre-determined delay with respect to the other correlator. Each correlator includes an integrator and a comparator, and may also include an averaging circuit that calculates an average output for each correlator, as well as a track and hold circuit for holding the output of the integrators. The receiver further includes an adjustable time delay circuit that may be used to adjust the pre-determined delay between the correlators in order to improve detection of the series of time-modulated pulses.

For greater elaboration of Vector modulation techniques, the reader is directed to the patent application entitled, "Vector Modulation System and Method for Wideband Impulse Radio Communications", Ser. No. 09/169,765, filed Dec. 9, 1999 and assigned to the assignee of the present invention. This patent application is incorporated herein by reference.

Receivers

Because of the unique nature of impulse radio receivers several modifications have been recently made to enhance system capabilities.

Multiple Correlator Receivers

Multiple correlator receivers utilize multiple correlators that precisely measure the impulse response of a channel and wherein measurements can extend to the maximum communications range of a system, thus, not only capturing ultra-wideband propagation waveforms, but also information on data symbol statistics. Further, multiple correlators enable rake acquisition of pulses and thus faster acquisition, tracking implementations to maintain lock and enable various modulation schemes. Once a tracking correlator is synchronized and locked to an incoming signal, the scanning correlator can sample the received waveform at precise time delays relative to the tracking point. By successively increasing the time delay while sampling the waveform, a complete, time-calibrated picture of the waveform can be collected.

For greater elaboration of utilizing multiple correlator techniques, the reader is directed to the patent application entitled, "System and Method of using Multiple Correlator Receivers in an Impulse Radio System", Ser. No. 09/537, 264, filed Mar. 29, 2000 and assigned to the assignee of the present invention. This patent application is incorporated herein by reference.

Fast Locking Mechanisms

Methods to improve the speed at which a receiver can acquire and lock onto an incoming impulse radio signal have been developed. In one approach, a receiver comprises an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in detail in U.S. Pat. No. 5,832,035 to Fullerton, incorporated herein by reference.

In another approach, a receiver obtains a template pulse train and a received impulse radio signal. The receiver compares the template pulse train and the received impulse radio signal to obtain a comparison result. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, the reader is directed to the patent application entitled, "Method and System for Fast Acquisition of Ultra Wideband Signals", Ser. No. 09/538, 292, filed Mar. 29, 2000 and assigned to the assignee of the present invention. This patent application is incorporated herein by reference.

Baseband Signal Converters

A receiver has been developed which includes a baseband signal converter device and combines multiple converter circuits and an RF amplifier in a single integrated circuit package. Each converter circuit includes an integrator circuit that integrates a portion of each RF pulse during a sampling period triggered by a timing pulse generator. The integrator capacitor is isolated by a pair of Schottky diodes connected to a pair of load resistors. A current equalizer circuit equalizes the current flowing through the load resistors when the integrator is not sampling. Current steering logic transfers load current between the diodes and a constant bias circuit depending on whether a sampling pulse is present.

For greater elaboration of utilizing baseband signal converters, the reader is directed to the patent application entitled, "Baseband Signal Converter for a Wideband Impulse Radio Receiver", Ser. No. 09/356,384, filed Jul. 16, 1999 and assigned to the assignee of the present invention. This patent application is incorporated herein by reference.

Power Control and Interference

Power Control

Power control improvements have been invented with respect to impulse radios. The power control systems comprise a first transceiver that transmits an impulse radio signal to a second transceiver. A power control update is calculated according to a performance measurement of the signal received at the second transceiver. The transmitter power of either transceiver, depending on the particular embodiment, is adjusted according to the power control update. Various performance measurements are employed according to the current invention to calculate a power control update, including bit error rate, signal-to-noise ratio, and received signal strength, used alone or in combination. Interference is thereby reduced, which is particularly important where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of utilizing baseband signal converters, the reader is directed to the patent application entitled, "System and Method for Impulse Radio Power Control", Ser. No. 09/332,501, filed Jun. 14, 1999 and assigned to the assignee of the present invention. This patent application is incorporated herein by reference.

Mitigating Effects of Interference

To assist in mitigating interference to impulse radio systems a methodology has been invented. The method comprises the steps of: (a) conveying the message in packets; (b) repeating conveyance of selected packets to make up a repeat package; and (c) conveying the repeat package a plurality of times at a repeat period greater than twice the occurrence period of the interference. The communication may convey a message from a proximate transmitter to a distal receiver, and receive a message by a proximate receiver from a distal transmitter. In such a system, the method comprises the steps of: (a) providing interference indications by the distal receiver to the proximate transmitter; (b) using the interference indications to determine predicted noise periods; and (c) operating the proximate transmitter to convey the message according to at least one of the following: (1) avoiding conveying the message during noise periods; (2) conveying the message at a higher power during noise periods; (3) increasing error detection coding in the message during noise periods; (4) re-transmitting the message following noise periods; (5) avoiding conveying the message when interference is greater than a first strength; (6) conveying the message at a higher power when the interference is greater than a second strength; (7) increasing error detection coding in the message when the interference is greater than a third strength; and (8) re-transmitting a portion of the message after interference has subsided to less than a predetermined strength.

For greater elaboration of mitigating interference to impulse radio systems, the reader is directed to the patent application entitled, "Method for Mitigating Effects of Interference in Impulse Radio Communication", Ser. No. 09/587,033, filed Jun. 2, 1999 and assigned to the assignee of the present invention. This patent application is incorporated herein by reference.

Moderating Interference while Controlling Equipment

Yet another improvement to impulse radio includes moderating interference with impulse radio wireless control of an appliance; the control is affected by a controller remote from the appliance transmitting impulse radio digital control signals to the appliance. The control signals have a transmission power and a data rate. The method comprises the steps of: (a) in no particular order: (1) establishing a maximum acceptable noise value for a parameter relating to interfering signals; (2) establishing a frequency range for measuring the interfering signals; (b) measuring the parameter for the interference signals within the frequency range; and (c) when the parameter exceeds the maximum acceptable noise value, effecting an alteration of transmission of the control signals.

For greater elaboration of moderating interference while effecting impulse radio wireless control of equipment, the reader is directed to the patent application entitled, "Method and Apparatus for Moderating Interference While Effecting Impulse Radio Wireless Control of Equipment", Ser. No. 09/586,163, filed Jun. 2, 1999 and assigned to the assignee of the present invention. This patent application is incorporated herein by reference.

Coding Advances

The improvements made in coding can directly improve the characteristics of impulse radio as used in the present invention. Specialized coding techniques may be employed to establish temporal and/or non-temporal pulse characteristics such that a pulse train will possess desirable properties. Coding methods for specifying temporal and non-temporal pulse characteristics are described in commonly owned, co-pending applications entitled "A Method and Apparatus for Positioning Pulses in Time", Ser. No. 09/592,249, and "A Method for Specifying Non-Temporal Pulse Characteristics", Ser. No. 09/592,250, both filed Jun. 12, 2000, and both of which are incorporated herein by reference. Essentially, a temporal or non-temporal pulse characteristic value layout is defined, an approach for mapping a code to the layout is specified, a code is generated using a numerical code generation technique, and the code is mapped to the defined layout per the specified mapping approach.

A temporal or non-temporal pulse characteristic value layout may be fixed or non-fixed and may involve value ranges, discrete values, or a combination of value ranges and discrete values. A value range layout specifies a range of values for a pulse characteristic that is divided into components that are each subdivided into subcomponents, which can be further subdivided, ad infinitum. In contrast, a discrete value layout involves uniformly or non-uniformly distributed discrete pulse characteristic values. A non-fixed layout (also referred to as a delta layout) involves delta values relative to some reference value such as the characteristic value of the preceding pulse. Fixed and non-fixed layouts, and approaches for mapping code element values to them, are described in co-owned, co-pending applications, entitled "Method for Specifying Pulse Characteristics using Codes", Ser. No. 09/592,290 and "A Method and Apparatus for Mapping Pulses to a Non-Fixed Layout", Ser. No. 09/591,691, both filed on Jun. 12, 2000 and both of which are incorporated herein by reference.

A fixed or non-fixed characteristic value layout may include one or more non-allowable regions within which a characteristic value of a pulse is not allowed. A method for specifying non-allowable regions to prevent code elements from mapping to non-allowed characteristic values is described in co-owned, co-pending application entitled "A Method for Specifying Non-Allowable Pulse Characteristics", Ser. No. 09/592,289, filed Jun. 12, 2000 and incorporated herein by reference. A related method that conditionally positions pulses depending on whether or not code elements map to non-allowable regions is described in co-owned, co-pending application, entitled "A Method and Apparatus for Positioning Pulses Using a Layout having Non-Allowable Regions", Ser. No. 09/592,248 and incorporated herein by reference.

Typically, a code consists of a number of code elements having integer or floating-point values. A code element value may specify a single pulse characteristic (e.g., pulse position in time) or may be subdivided into multiple components, each specifying a different pulse characteristic. For example, a code having seven code elements each subdivided into five components (c0–c4) could specify five different characteristics of seven pulses. A method for subdividing code elements into components is described in commonly owned, co-pending application entitled "Method for Specifying Pulse Characteristics using Codes", Ser. No. 09/592,290, filed Jun. 12, 2000 previously referenced and again incorporated herein by reference. Essentially, the value of each code element or code element component (if subdivided) maps to a value range or discrete value within the defined characteristic value layout. If a value range layout is used an offset value is typically employed to specify an exact value within the value range mapped to by the code element or code element component.

The signal of a coded pulse train can be generally expressed:

$$s_{tr}^{(k)}(t) = \sum_j (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)f_j^{(k)}$, $a_j^{(k)}$, $c_j^{(k)}$, and $b_j^{(k)}$ are the coded polarity, amplitude, width, and waveform of the jth pulse of the kth transmitter, and $T_j^{(k)}$ is the coded time shift of the jth pulse of the kth transmitter. Note: When a given non-temporal characteristic does not vary (i.e., remains constant for all pulses in the pulse train), the corresponding code element component is removed from the above expression and the non-temporal characteristic value becomes a constant in front of the summation sign.

Various numerical code generation methods can be employed to produce codes having certain correlation and spectral properties. Such codes typically fall into one of two categories: designed codes and pseudorandom codes.

A designed code may be generated using a quadratic congruential, hyperbolic congruential, linear congruential, Costas array or other such numerical code generation technique designed to generate codes guaranteed to have certain correlation properties. Each of these alternative code generation techniques has certain characteristics to be considered in relation to the application of the pulse transmission system employing the code. For example, Costas codes have nearly ideal autocorrelation properties but somewhat less than ideal cross-correlation properties, while linear congruential codes have nearly ideal cross-correlation properties but less than ideal autocorrelation properties. In some cases, design tradeoffs may require that a compromise between two or more code generation techniques be made such that a code is generated using a combination of two or more techniques. An example of such a compromise is an extended quadratic congruential code generation approach that uses two 'independent' operators, where the first operator is linear and the second operator is quadratic. Accordingly, one, two, or more code generation techniques or combinations of such techniques can be employed to generate a code without departing from the scope of the invention.

A pseudorandom code may be generated using a computer's random number generator, binary shift-register(s) mapped to binary words, a chaotic code generation scheme, or another well-known technique. Such 'random-like' codes are attractive for certain applications since they tend to spread spectral energy over multiple frequencies while having 'good enough' correlation properties, whereas designed codes may have superior correlation properties but have spectral properties that may not be as suitable for a given application.

Computer random number generator functions commonly employ the linear congruential generation (LCG) method or the Additive Lagged-Fibonacci Generator (ALFG) method. Alternative methods include inversive congruential generators, explicit-inversive congruential generators, multiple recursive generators, combined LCGs, chaotic code generators, and Optimal Golomb Ruler (OGR) code generators. Any of these or other similar methods can be used to generate a pseudorandom code without departing from the scope of the invention, as will be apparent to those skilled in the relevant art.

Detailed descriptions of code generation and mapping techniques are included in a co-owned patent application entitled "A Method and Apparatus for Positioning Pulses in Time", Ser. No. 09/638,150, filed Aug. 15, 2000, which is hereby incorporated by reference.

It may be necessary to apply predefined criteria to determine whether a generated code, code family, or a subset of a code is acceptable for use with a given UWB application. Criteria to consider may include correlation properties, spectral properties, code length, non-allowable regions, number of code family members, or other pulse characteristics. A method for applying predefined criteria to codes is described in co-owned, co-pending application, entitled "A Method and Apparatus for Specifying Pulse Characteristics using a Code that Satisfies Predefined Criteria", Ser. No. 09/592,288, filed Jun. 12, 2000 and is incorporated herein by reference.

In some applications, it may be desirable to employ a combination of two or more codes. Codes may be combined sequentially, nested, or sequentially nested, and code combinations may be repeated. Sequential code combinations typically involve transitioning from one code to the next after the occurrence of some event. For example, a code with properties beneficial to signal acquisition might be employed until a signal is acquired, at which time a different code with more ideal channelization properties might be used. Sequential code combinations may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in desirable spectral properties. A method for applying code combinations is described in co-owned, co-pending application, entitled "A Method and Apparatus for Applying Codes Having Pre-Defined Properties", Ser. No. 09/591,690, filed Jun. 12, 2000 which is incorporated herein by reference.

UWB Smart Farming

Referring to FIGS. 9–25, there are an exemplary system 900, an exemplary electronic monitor 910, and preferred methods 1200 and 1300 in accordance with the present invention.

Although the present invention is described as using impulse radio technology, it should be understood that the present invention can be used with any type of ultra wideband technology, but is especially suited for use with time-modulated ultra wideband technology. Accordingly, the system 900, the electronic monitor 910, and the methods 1200 and 1300 should not be construed in a limited manner.

Figure 9:
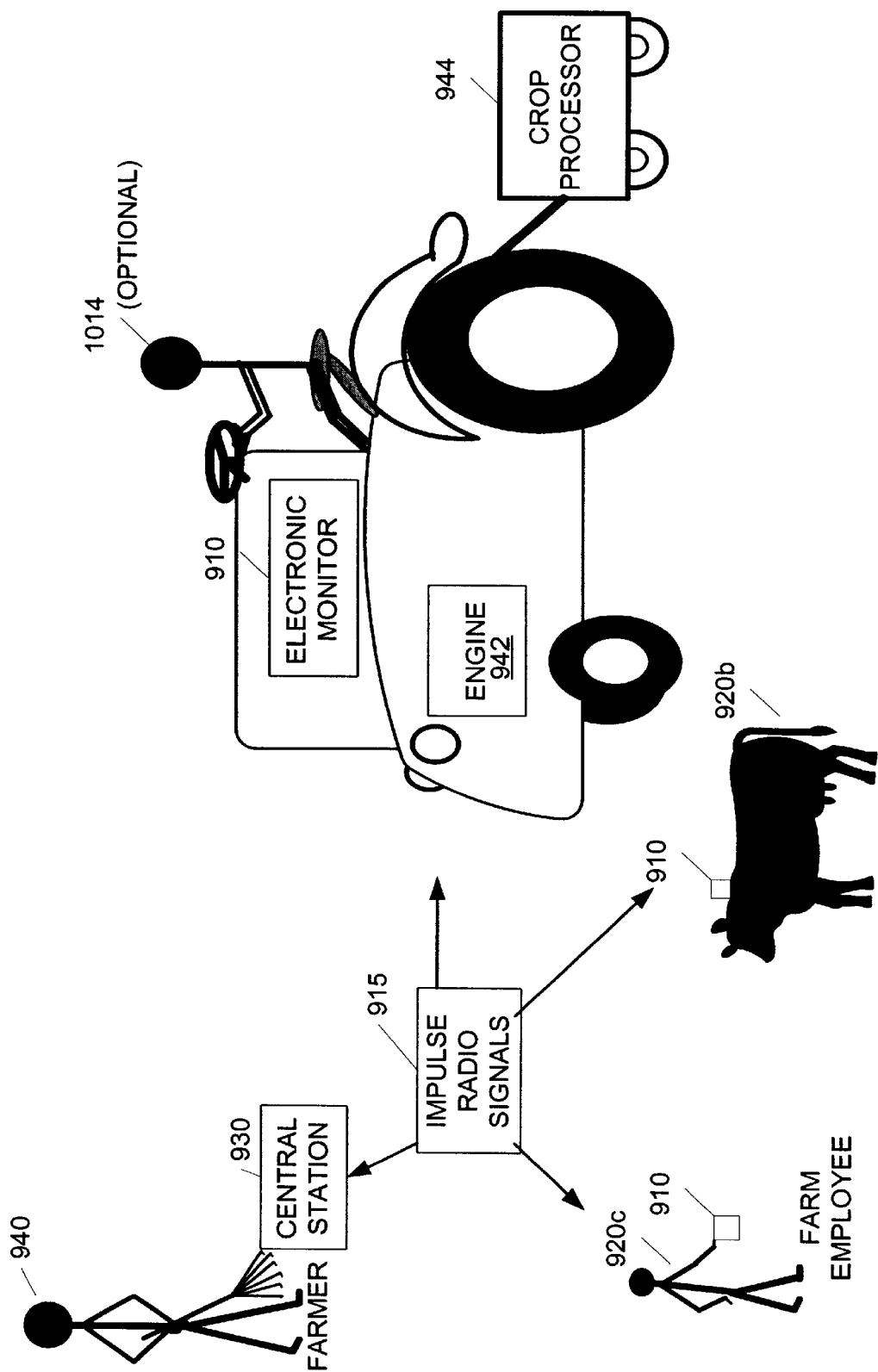
FIG. 9 is a diagram illustrating the basic components of a system in accordance with the present invention.

Referring to FIG. 9, there is a diagram illustrating the basic components of the system 900 in accordance with the present invention. Essentially, the system 900 includes an electronic monitor 910 that is attached to an object 920 (e.g., tractor 920a, farm animal 920b, farm employee 920c) associated with the farming field. The electronic monitor 910 is capable of transmitting and receiving impulse radio signals 915 to and from a central station 930.

The impulse radio signals 915 contain information that enables a person 940 (e.g., farmer) using the central station 930 to track the position of the object 920 (e.g., tractor 920a, farm animal 920b, farm employee 920c) as it moves around a farm 1100 (see FIG. 11) and/or enables the farmer to monitor an engine 942, crop processor 944 and other parameters of the moving tractor 920a. In addition, the system 900 can use the information in the impulse radio signals 915 to help control either remotely or automatically the farm equipment 920a. As will be described in greater detail below, the electronic monitor 910 and central station 930 utilize the revolutionary position capabilities and communication capabilities of impulse radio technology to track, control and/or monitor one or more objects 920 (e.g., tractors 920a, farm animals 920b, farm employees 920c . . . ) in a manner not possible with traditional positioning and monitoring systems. For instance, traditional positioning systems generally use Global Positioning System (GPS) based technology to roughly approximate within 5–10 meters a position of a person or object. However, impulse radio technology enables very precise position calculations that can take place in less than a second and have a potential accuracy of less than +/−2 centimeters, which is a marked improvement over the traditional GPS based technology.

Figure 10:
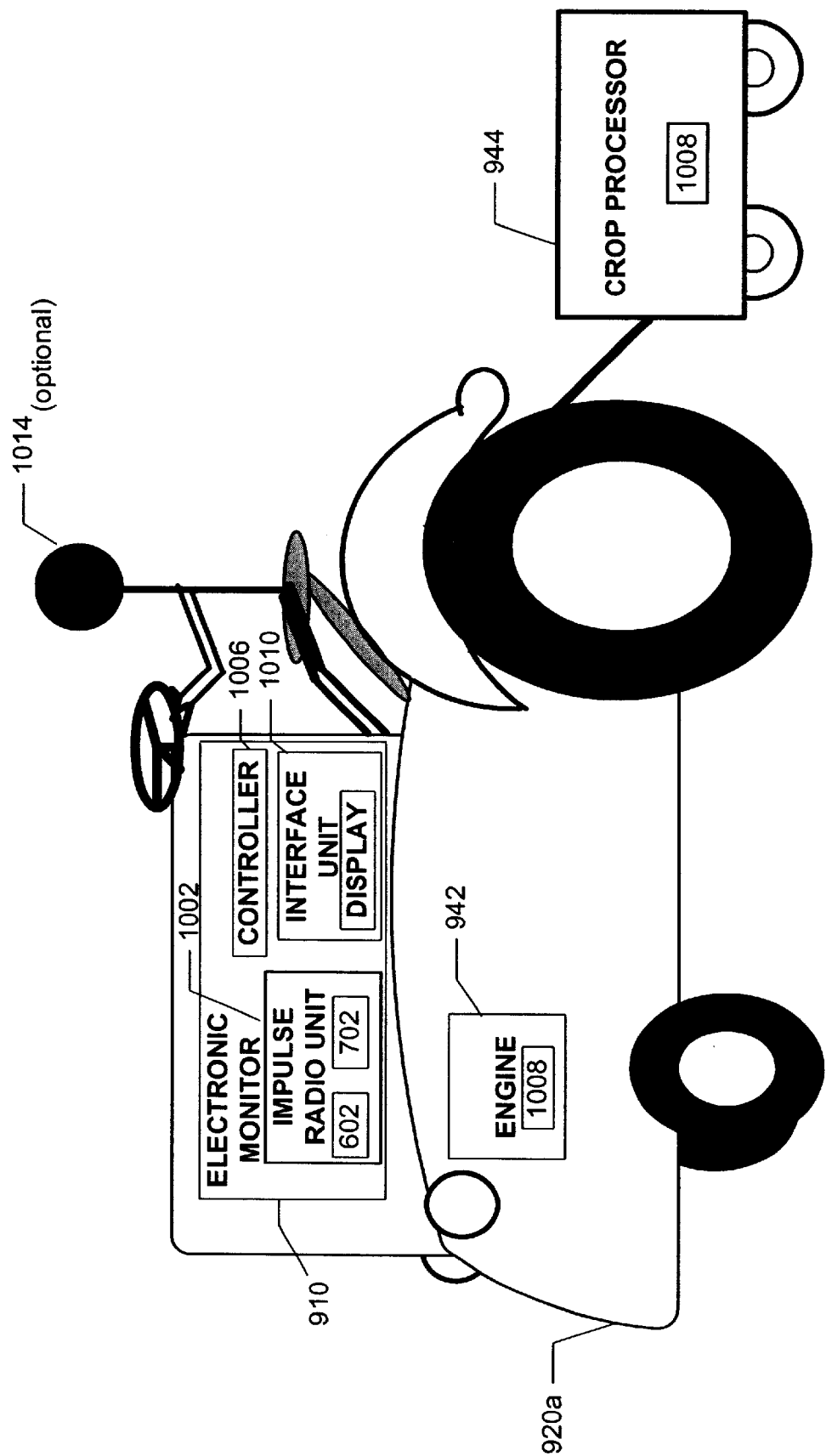
FIG. 10 is a diagram illustrating in greater detail an electronic monitor and tractor of the system shown in FIG. 9.

Referring to FIG. 10, there is a diagram illustrating in greater detail the electronic monitor 910 and tractor 920a of the system 900 shown in FIG. 9. The electronic monitor 910 includes an impulse radio unit 1002 having an impulse radio transmitter 602 and/or an impulse radio receiver 702 (see FIGS. 6 and 7 ). The impulse radio unit 1002 is capable of interacting with one or more reference impulse radio units 1110 (see FIG. 11) such that either the electronic monitor 910, central station 930, or one of the reference impulse radio units 1110 can calculate the current position of the tractor 920a, farm animal 920b or farm employee 920c on the farm 1100. How the impulse radio units 1002 and 1110 interact with one another to determine the position of the tractor 920a can best be understood by referring to the description associated with FIGS. 14–25.

The electronic monitor 910 may also include a controller 1006 operable to interact with a variety of controllers/sensors 1008 (only two shown) to monitor one or more parameters of the tractor 920a. For instance, the controller 1006 can monitor one or more parameters of the engine 942 or a crop processor 944 attached to the tractor 920a. The controller 1006 can forward the monitored parameters to the impulse radio unit 1002 which, in turn, modulates and forwards the information using impulse radio signals 915 to the central station 930.

The controller 1006 can be remotely activated by the central station 930 to monitor any one of a variety of parameters associated with the tractor 920a. The controller 1006 can also be programmed to compare a monitored parameter to a predetermined range of acceptable conditions. And, in the event the controller 1006 monitors a parameter that falls outside of a predetermined range of acceptable conditions, then the electronic monitor 910 can send an alert to the central station 930. A variety of monitoring techniques that can be used in the present invention have been disclosed in U.S. patent application Ser. No. 09/407,106.

The controller 1006 can also control the tractor 920a and various types of farm equipment attached to the tractor 920a. In fact, the tractor 920a and associated farm equipment (shown as crop processor 944) can be remotely/automatically controlled using the central station 930 or automatically controlled using the controller 1006. Moreover, the tractor 920a and associated farm equipment can be controlled by the controller 1006 or the central station 930 in accordance with an agronomic plan. An agronomic plan is similar to precision farming and is often based on a survey that gives the farmer 940 an idea on how to seed, fertilize, irrigate and apply insecticide to the crops in order to optimize the productivity of the farming operation.

The electronic monitor 910 may also include an interface unit 1010 (e.g., speaker, microphone) which enables two-way communications between the person 940 using the central station 930 and a person 1014 (if any) operating the tractor 920a. The interface unit 1010 can include a display 1012 that enables the person 1014 operating the tractor 920a to view the positions of heir tractor 920a and other tractors, farm animals 920b, farm employees 920c . . . as they move around the farm 1100. The display 1012 also enables the person 1014 operating the tractor 920a to view the monitored parameter(s) of the tractor 920a and the crop processor 944. The central station 930 can also include an interface unit similar to the interface unit 1010 in the electronic monitor 910.

Figure 11:
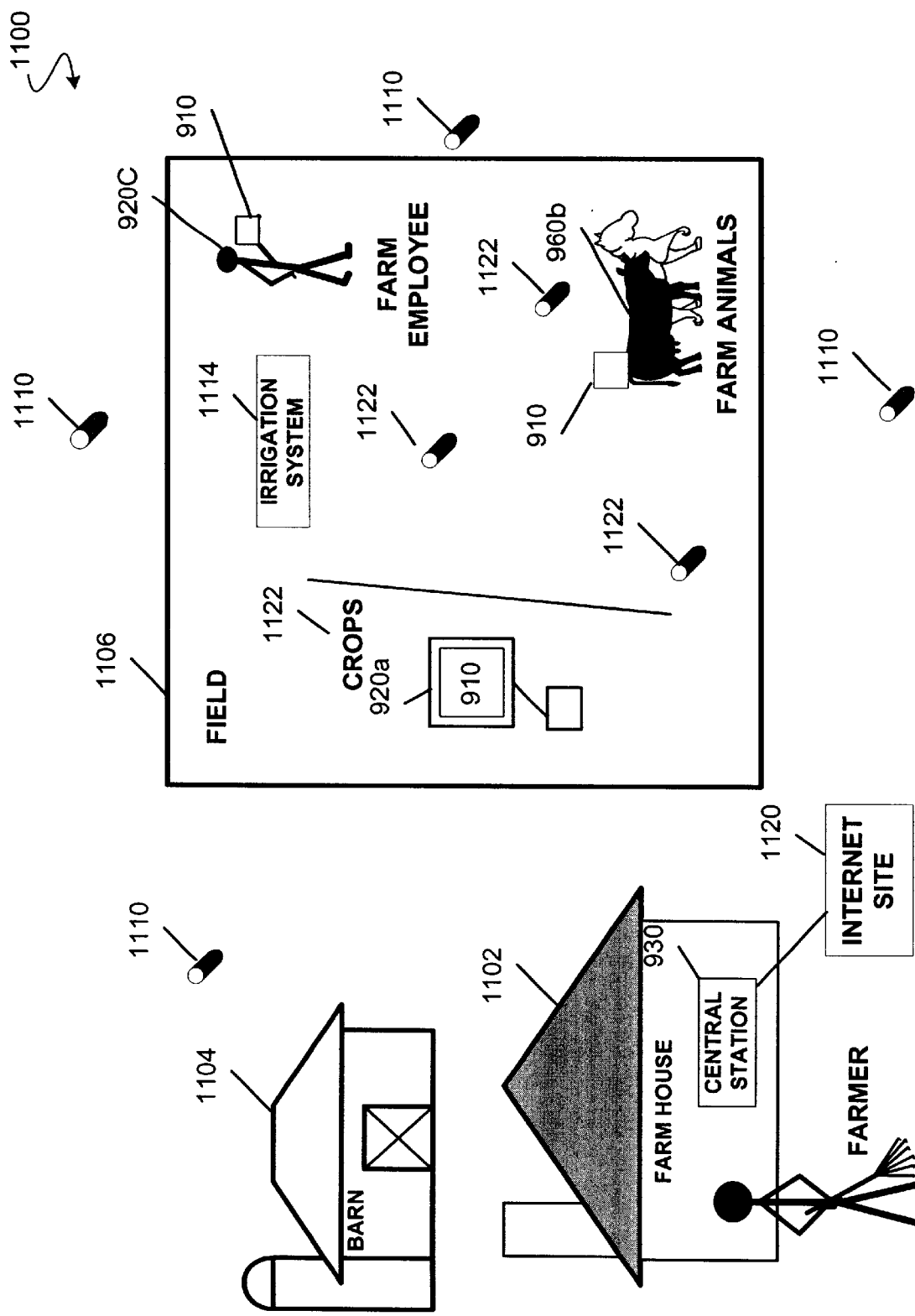
FIG. 11 is a diagram illustrating the system of FIG. 9 used in a farming environment.

The interface unit 1010 also enables two-way communications between the farmer 940 using the central station 930 and a farm employee 920c carrying a handheld electronic monitor 910 (see FIG. 11). Typically, the farm animal 920b would be attached to an electronic monitor 910 that includes only an impulse radio unit 1002 and/or some sort of sensor.

Referring to FIG. 11, there is a diagram illustrating a system 900 that can be used in a farm environment. As illustrated, the farm 1100 includes a farm house 1102, a barn 1104 and a field 1106. The farmhouse 1102 (as shown) or the barn 1104 can be where the farmer 940 interacts with the central station 930. Of course, the illustrated layout of the farm 1100 is for purposes of discussion only and is not intended as a limitation to the present invention.

The reference impulse radio units 1110 (only 5 shown) have known positions and are located to provide maximum coverage on the farm 1100. The central station 930 typically has a wireless connection or hardwire connection to the reference impulse radio units 1110, and the electronic monitor 910 typically has a wireless connection to the reference impulse radio units. Each electronic monitor 910 (only three shown) is capable of interacting with one or more of the reference impulse radio units 1110 such that either the electronic monitor 910, the central station 930, or one of the reference impulse radio units 1110 can calculate the current position of an object 920 which can be a tractor 920a, farm animal 920b or farm employee 920c. A variety of impulse radio positioning networks (e.g., two or more reference impulse radio units 1110 and one or more electronic monitors 910) that enable the present invention to perform the positioning and tracking functions are described in greater detail with respect to FIGS. 14–25.

For instance, the positioning and tracking functions can be accomplished by stepping through several steps. The first step is for the reference impulse radio units 1110 to synchronize together and begin passing information. Then, when an electronic monitor 910 is turned-on and enters the farm 1100, it synchronizes itself to the previously synchronized reference impulse radio units 1110. Once the electronic monitor 910 is synchronized, it begins collecting and time-tagging range measurements from available reference impulse radio units 1110. The electronic monitor 910 then takes these time-tagged ranges and, using a least squares-based or similar estimator, calculates its position on the farm 1100. Alternatively, one of the reference impulse radio units 1110 can calculate the position of the electronic monitor 910. Thereafter, the electronic monitor 910 or one of the reference impulse radio units 1110 forwards its position calculation to the central station 930 for storage and/or real-time display. The central station 930 can be programmed to track only the tractors 920*a*, farm animals 920*b* or farm employees 920*c* that the farmer 940 would like to watch at one time.

As described above, the central station 930 or electronic monitor 910 can control the tractor 920*a* and various types of farm equipment attached to the tractor 920*a*. Basically, the controller 1006 or central station 930 by knowing the position of the tractor 920*a* can compare that position to a map of the farm 1100 and then control the movements, speed and operations of the tractor 920*a* and associated equipment. For instance, the controller 1006 or the central station 930 can automatically steer the tractor 920*a* along a crop line 1122 to effectively harvest the crop. In addition, the controller 1006 or the central station 930 can automatically control the tractor 920*a* and associated equipment to effectively distribute fertilizer, seeds, insecticides . . . in accordance with an agronomic plan. Moreover, the controller 1006 or the central station 930 can automatically control other farm equipment such as an irrigation system 1114 to distribute water on the farm 1100.

It should also be understood that the electronic monitor 910 may communicate with sensors 1122 (only two shown) which function to monitor the soil and crop conditions on the farm 1100. The central station 930 may also communicate with the sensors 1122 that monitor the soil and crop conditions on the farm 1100.

The central station 930 may also provide an Internet site 1120 with the current positions of the tractors 920*a*, farm animals 920*b* and farm employees 920*c* on the farm 1100, and the monitored parameters of each tractor 920*a*. Thus, other people can watch the farming operations on their computer (or television) and at the same time obtain all the details they would want to know about a specific tractor 920*a*, farm animal 920*b* or farm employee 920*c*.

Figure 12:
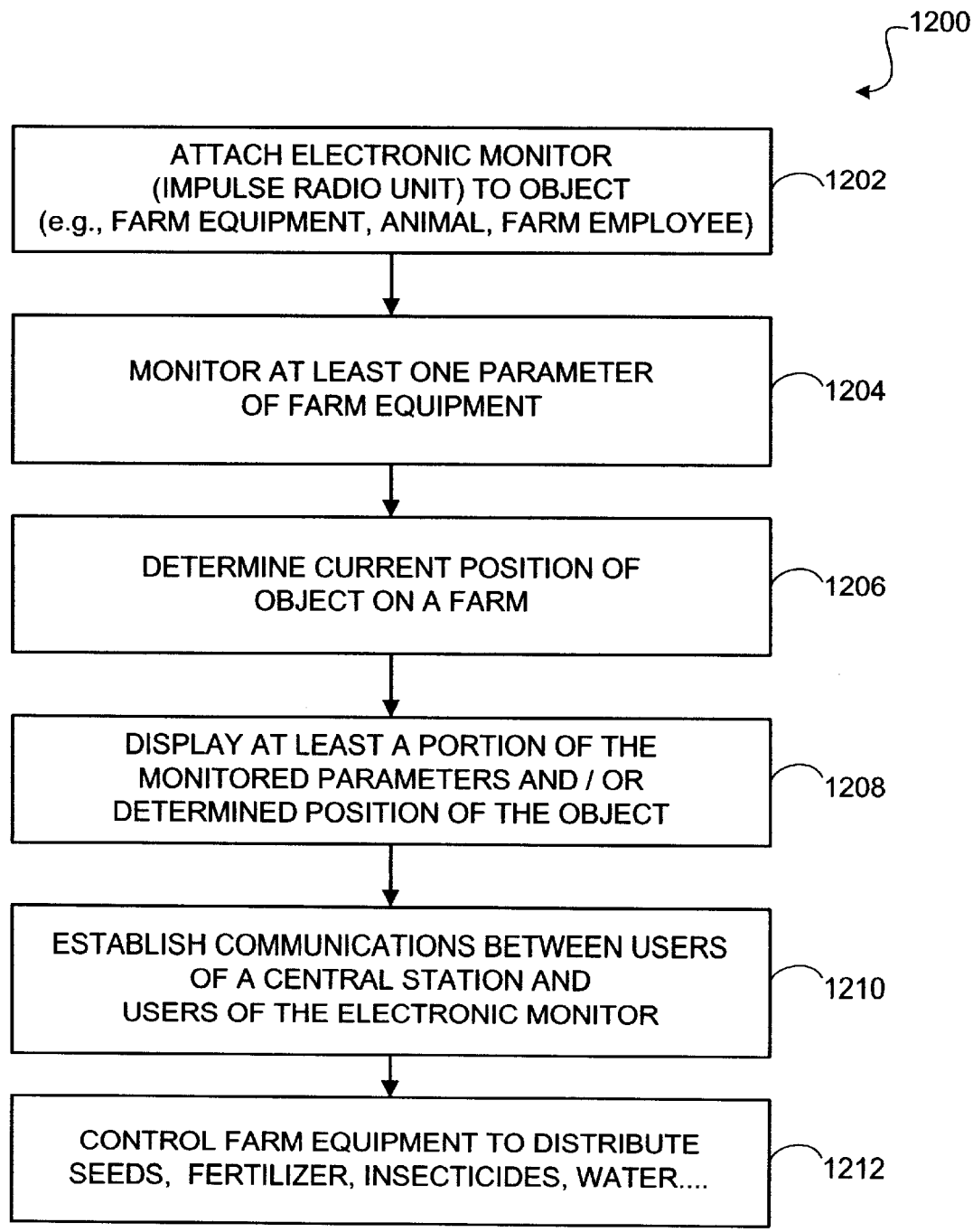
FIG. 12 is a flowchart illustrating the basic steps of a preferred method for tracking and monitoring an object in accordance with the present invention.

Referring to FIG. 12, there is a flowchart illustrating the basic steps of a preferred method 1200 for tracking and monitoring farm equipment 920*a*, farm animals 920*b*, farm employees 920*c* . . . in accordance with the present invention. Beginning at step 1202, the electronic monitor 910 (including the impulse radio unit 1002) is attached to a tractor 920*a* (farm equipment), farm animal 920*b* or farm employee 920*c* . . . .

At step 1204, the electronic monitor 910 includes a controller 1006 that interacts with a variety of controllers/sensors 1008 to monitor one or more parameters of the tractor 920*a* and any associated farm equipment. For instance, the controller 1006 can monitor the engine 942, the crop processor 944 and other parameters of the tractor 920*a*. The engine 942 can be monitored to provide details about its air intake, fuel level, temperature, pressure, power output, tachometer, speed . . . . Other parameters that can be monitored on the associated farm equipment such as a harvester or crop processor 944 include, for example, a rotor speed, sieve opening or cleaning fan speed.

The controller 1006 can be remotely activated by the central station 930 to monitor any one of a variety of parameters of the tractor 920*a* and any associated farm equipment. The controller 1006 can also be programmed to compare a monitored parameter to a predetermined range of acceptable conditions. And, in the event the controller 1006 monitors a parameter that falls outside of a predetermined range of acceptable conditions, then the electronic monitor 910 can send an alert to the central station 930.

At step 1206, the electronic monitor 910 can determine the current location on the farm 1100 of the moving tractor 920*a*, farm animal 920*b* and/or farm employee 920*c* by interacting with a predetermined number of reference impulse radio units 1110. The electronic monitor 910 operates to forward to the central station 930 a series of impulse radio signals 915 containing information including the monitored parameters and/or the current position of the tractor 920*a*, farm animal 920*b* and/or farm employee 920*c* on the farm 1100. It should be noted that one or more of the reference impulse radio units 1110 and the central station 930 is capable of determining the current position of the tractor 920*a*, farm animal 920*b* and/or farm employee 920*c* on the farm 1100.

At step 1208, the central station 930 is operable to display all or a selected portion of the information transmitted from the electronic monitor 910. The information that can be displayed includes the monitored parameter(s) and/or the current position of the tractor 920*a*, farm animal 920*b* and/or farm animal 920*c* on the farm 1100. The central station 930 can also display an alarm whenever one of the monitored parameters exceeds a predetermined threshold. In addition, the central station 930 is capable of distributing this information to the Internet site 1120. The central station 930, electronic monitor 910 and the Internet site 1120 can all display an overlay of the farm 1100 indicating the monitored parameters and the current position of the tractor 920*a*, farm animal 920*b* and/or farm employee 920*c*.

At step 1210, the electronic monitor 912 can enable two-way impulse radio communications between the person 940 using the central station 930 and the person 1014 (if any) operating the tractor 920*a*. In addition, the electronic monitor 912 also enables two-way impulse radio communications between the person 940 using the central station 930 and the farm employee 920*c* carrying a handheld electronic monitor 910.

At step 1212, the controller 1006 can also control the tractor 920*a* and various types of farm equipment attached to the tractor 920*a*. In fact, the tractor 920*a* and associated farm equipment can be remotely/automatically controlled using the central station 930 or automatically controlled using the controller 1006. Moreover, the tractor 920*a* and associated farm equipment can be controlled by the controller 1006 or the central station 930 in accordance with an agronomic plan. Again, the agronomic plan is similar to precision farming and is often based on a survey that gives the farmer 940 an idea on how to seed, fertilize, irrigate and apply insecticide to the crops in order to optimize the productivity of the farming operation.

Basically, the controller 1006 or central station 930 by knowing the position of the tractor 920*a* can compare that position to a map of the farm 1100 and then control the movements, speed and operations of the tractor 920*a* and associated equipment. For instance, the controller 1006 or the central station 930 can automatically steer the tractor 920*a* along a crop line 1122 on the farm 1100 to effectively harvest the crop. In addition, the controller 1006 or the central station 930 can automatically control the tractor 920*a* and associated equipment to effectively distribute fertilizer, seeds, insecticides . . . in accordance with an agronomic plan. Moreover, the controller 1006 or the central station 930 can automatically control other farm equipment such as an irrigation system 1114 to distribute water on the farm 1100.

Figure 13:
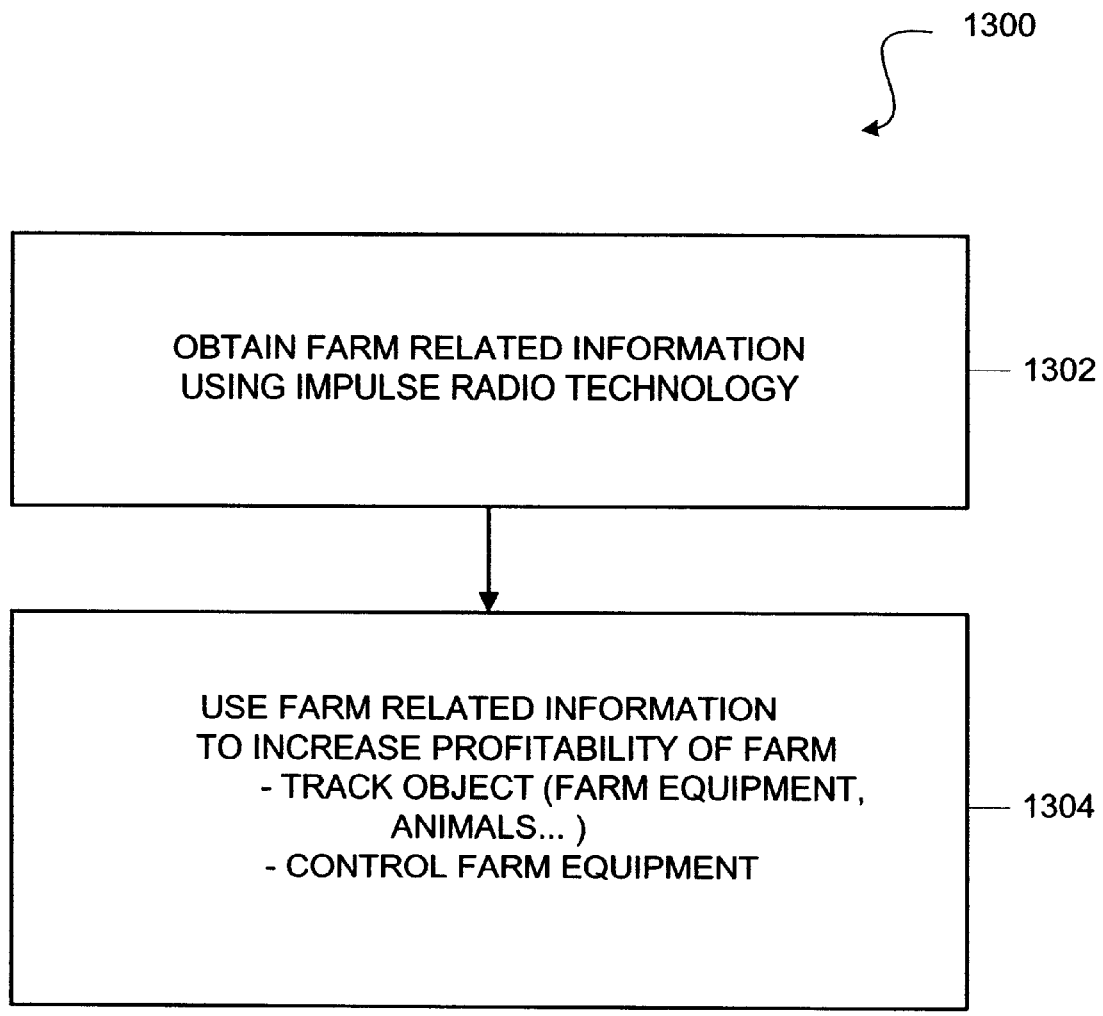
FIG. 13 is a flowchart illustrating the basic steps of a preferred method for increasing the profitability of a farming operation in accordance with the present invention.

Referring to FIG. 13, there is a flowchart illustrating the basic steps of a preferred method 1300 for managing a farm in accordance with the present invention. Basically, the preferred method 1300 includes step 1302 where farm related information is obtained using impulse radio technology. The farm related information can include data such as the monitored parameters of the tractor 920a, the monitored soil conditions, the monitored crop conditions, and the current positions of the tractor 920a, farm animals 920b and farm employees 920c on the farm 1100. At step 1304, the farmer 940 can use the farm related information to increase the profitability of the farm 1100. For instance, the farmer 940 can use the farm related information to track where the farm equipment (e.g., tractor 920a, irrigation system 1114), the farm animals 920b and the farm employees 920c are currently located on the farm 1110. Knowing this information enables the farmer 940 to better manage their resources which would increase the profitability of the farming operations. As described above, the farmer 940 can also use the farm related information to automatically control the farm equipment in accordance with an agronomic plan.

Impulse Radio Positioning Networks

A variety of impulse radio positioning networks capable of performing the positioning and tracking functions of the present invention are described in this Section (see also U.S. patent application Ser. No. 09/456,409). An impulse radio positioning network includes a set of reference impulse radio units 1110 (shown below as reference impulse radio units R1–R6), one or more electronic monitors 910 (shown below as electronic monitors M1–M3) and a central station 930 (shown as CS).

Synchronized Transceiver Tracking Architecture

Figure 14:
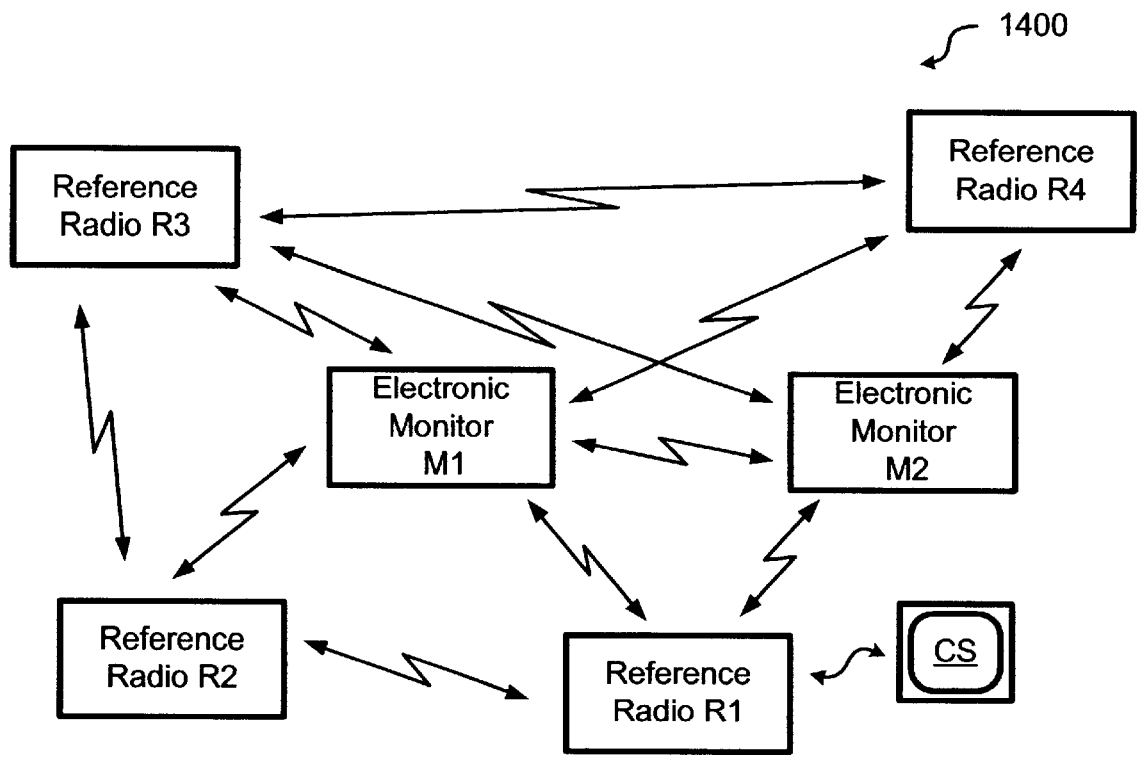
FIG. 14 is a block diagram of an impulse radio positioning network utilizing a synchronized transceiver tracking architecture that can be used in the present invention.

Referring to FIG. 14, there is illustrated a block diagram of an impulse radio positioning network 1400 utilizing a synchronized transceiver tracking architecture. This architecture is perhaps the most generic of the impulse radio positioning networks since both electronic monitors M1 and M2 and reference impulse radio units R1–R4 are full two-way transceivers. The network 1400 is designed to be scalable, allowing from very few electronic monitors M1 and M2 and reference impulse radio units R1–R4 to a very large number.

This particular example of the synchronized transceiver tracking architecture shows a network 1400 of four reference impulse radio units R1–R4 and two electronic monitors M1 and M2. The arrows between the radios represent two-way data and/or voice links. A fully inter-connected network would have every radio continually communicating with every other radio, but this is not required and can be dependent upon the needs of the particular application.

Each radio is a two-way transceiver; thus each link between radios is two-way (duplex). Precise ranging information (the distance between two radios) is distributed around the network 1400 in such a way as to allow the electronic monitors M1 and M2 to determine their precise three-dimensional position within a local coordinate system. This position, along with other data or voice traffic, can then be relayed from the electronic monitors M1 and M2 back to the reference master impulse radio unit R1, one of the other reference relay impulse radio units R2–R4 or the central station 930.

The radios used in this architecture are impulse radio two-way transceivers. The hardware of the reference impulse radio units R1–R4 and electronic monitors M1 and M2 is essentially the same. The firmware, however, varies slightly based on the functions each radio must perform. For example, the reference master impulse radio unit R1 directs the passing of information and is typically responsible for collecting all the data for external graphical display at the central station 930. The remaining reference relay impulse radio units R2–R4 contain a separate version of the firmware, the primary difference being the different parameters or information that each reference relay impulse radio unit R2–R4 must provide the network. Finally, the electronic monitors M1 and M2 have their own firmware version that calculates their position.

In FIG. 14, each radio link is a two-way link that allows for the passing of information, both data and/or voice. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other radios transmit in their assigned transmit time slots, the entire group of radios within the network, both electronic monitors M1 and M2 and reference impulse radio units R1–R4, are able to synchronize themselves. The oscillators used on the impulse radio boards drift slowly in time, thus they may require continual monitoring and adjustment of synchronization. The accuracy of this synchronization process (timing) is dependent upon several factors including, for example, how often and how long each radio transmits.

The purpose of this impulse radio positioning network 1400 is to enable the tracking of the electronic monitors M1 and M2. Tracking is accomplished by stepping through several well-defined steps. The first step is for the reference impulse radio units R1–R4 to synchronize together and begin passing information. Then, when a electronic monitor M1 or M2 enters the network area, it synchronizes itself to the previously synchronized reference impulse radio units R1–R4. Once the electronic monitor M1 or M2 is synchronized, it begins collecting and time-tagging range measurements from any available reference impulse radio units R1–R4 (or other electronic monitor M1 or M2). The electronic monitor M1 or M2 then takes these time-tagged ranges and, using a least squares-based or similar estimator, calculates the position of the electronic monitor M1 or M2 in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the electronic monitor M1 or M2 forwards its position calculation to the central station 930 for storage and real-time display.

Unsynchronized Transceiver Tracking Architecture

Figure 15:
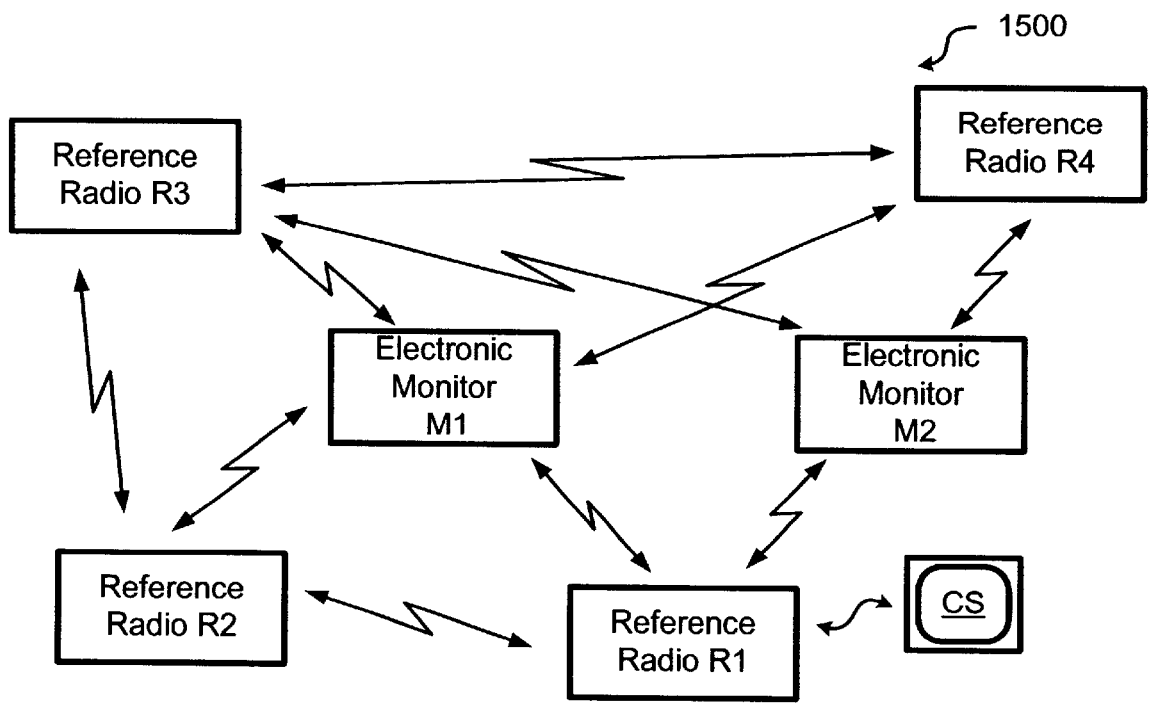
FIG. 15 is a block diagram of an impulse radio positioning network utilizing an unsynchronized transceiver tracking architecture that can be used in the present invention.

Referring to FIG. 15, there is illustrated a block diagram of an impulse radio positioning network 1500 utilizing an unsynchronized transceiver tracking architecture. This architecture is similar to synchronized transceiver tracking of FIG. 14, except that the reference impulse radio units R1–R4 are not time-synchronized. Both the electronic monitors M1 and M2 and reference impulse radio units R1–R4 for this architecture are full two-way transceivers. The network is designed to be scalable, allowing from very few electronic monitors M1 and M2 and reference impulse radio units R1–R4 and to a very large number.

This particular example of the unsynchronized transceiver tracking architecture shows a network 1500 of four reference impulse radio units R1–R4 and two electronic monitors M1 and M2. The arrows between the radios represent two-way data and/or voice links. A fully inter-connected network would have every radio continually communicating with every other radio, but this is not required and can be defined as to the needs of the particular application.

Each radio is a two-way transceiver; thus each link between radios is two-way (duplex). Precise ranging information (the distance between two radios) is distributed around the network in such a way as to allow the electronic monitors M1 and M2 to determine their precise three-dimensional position within a local coordinate system. This position, along with other data or voice traffic, can then be relayed from the electronic monitors M1 and M2 back to the reference master impulse radio unit R1, one of the other reference relay impulse radio units R2–R3 or the central station 930.

The radios used in the architecture of FIG. 15 are impulse radio two-way transceivers. The hardware of the reference impulse radio units R1–R4 and electronic monitors M1 and M2 is essentially the same. The firmware, however, varies slightly based on the functions each radio must perform. For example, the reference master impulse radio unit R1 directs the passing of information, and typically is responsible for collecting all the data for external graphical display at the central station 930. The remaining reference relay impulse radio units R2–R4 contain a separate version of the firmware, the primary difference being the different parameters or information that each reference relay radio must provide the network. Finally, the electronic monitors M1 and M2 have their own firmware version that calculates their position and displays it locally if desired.

In FIG. 15, each radio link is a two-way link that allows for the passing of information, data and/or voice. The data-rates between each radio link is a function of several variables including the number of pulses integrated to get a single bit, the number of bits per data parameter, the length of any headers required in the messages, the range bin size, and the number of radios in the network.

Unlike the radios in the synchronized transceiver tracking architecture, the reference impulse radio units R1–R4 in this architecture are not time-synchronized as a network. These reference impulse radio units R1–R4 operate independently (free-unning) and provide ranges to the electronic monitors M1 and M2 either periodically, randomly, or when tasked. Depending upon the application and situation, the reference impulse radio units R1–R4 may or may not talk to other reference radios in the network.

As with the architecture of FIG. 14, the purpose of this impulse radio positioning network 1500 is to enable the tracking of electronic monitors M1 and M2. Tracking is accomplished by stepping through several steps. These steps are dependent upon the way in which the reference impulse radio units R1–R4 range with the electronic monitors M1 and M2 (periodically, randomly, or when tasked). When a electronic monitor M1 or M2 enters the network area, it either listens for reference impulse radio units R1–R4 to broadcast, then responds, or it queries (tasks) the desired reference impulse radio units R1–R4 to respond. The electronic monitor M1 or M2 begins collecting and time-tagging range measurements from reference (or other mobile) radios. The electronic monitor M1 or M2 then takes these time-tagged ranges and, using a least squares-based or similar estimator, calculates the position of the electronic monitor M1 or M2 in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the electronic monitor M1 or M2 forwards its position calculation to the central station 930 for storage and real-time display.

Synchronized Transmitter Tracking Architecture

Figure 16:
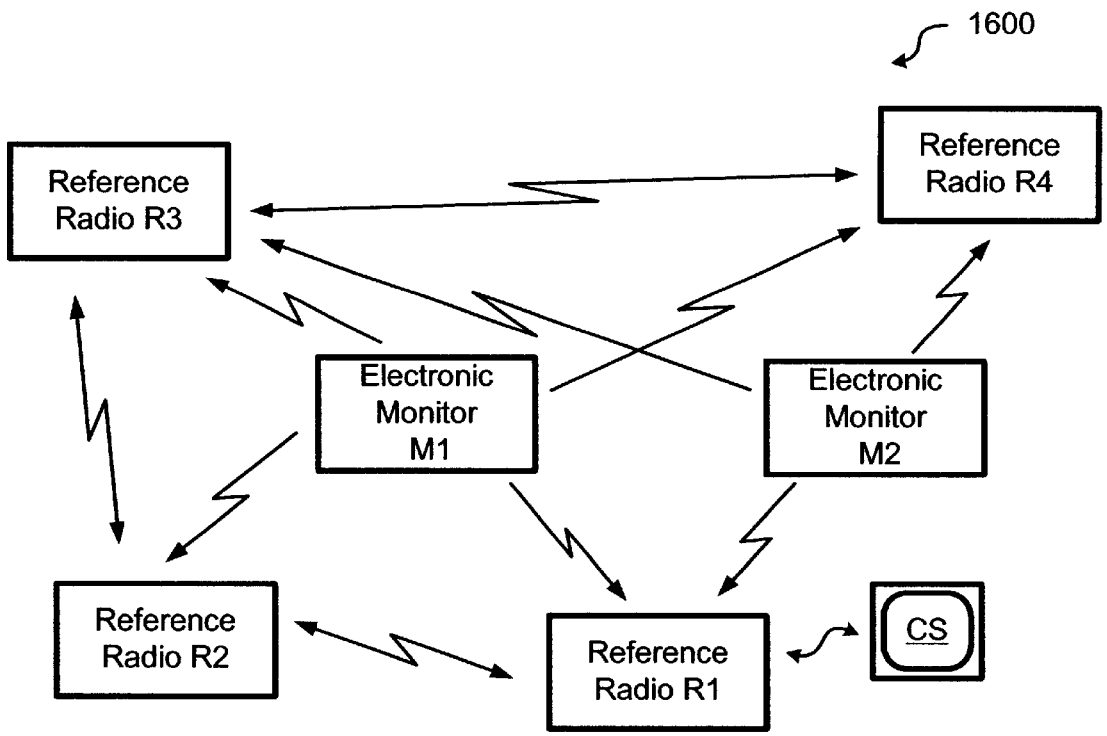
FIG. 16 is a block diagram of an impulse radio positioning network utilizing a synchronized transmitter tracking architecture that can be used in the present invention.

Referring to FIG. 16, there is illustrated a block diagram of an impulse radio positioning network 1600 utilizing a synchronized transmitter tracking architecture. This architecture is perhaps the simplest of the impulse radio positioning architectures, from the point-of-view of the electronic monitors M1 and M2, since the electronic monitors M1 and M2 simply transmit in a free-running sense. The network is designed to be scalable, allowing from very few electronic monitors M1 and M2 and reference impulse radio units R1–R4 to a very large number. This architecture is especially applicable to an "RF tag" (radio frequency tag) type of application.

This particular example of synchronized transmitter tracking architecture shows a network 1600 of four reference impulse radio units radios R1–R4 and two electronic monitors M1 and M2. The arrows between the radios represent two-way and one-way data and/or voice links. Notice that the electronic monitors M1 and M2 only transmit, thus they do not receive the transmissions from the other radios.

Each reference impulse radio unit R1–R4 is a two-way transceiver; thus each link between reference impulse radio units R1–R4 is two-way (duplex). Precise ranging information (the distance between two radios) is distributed around the network in such a way as to allow the synchronized reference impulse radio units R1–R4 to receive transmissions from the electronic monitors M1 and M2 and then determine the three-dimensional position of the electronic monitors M1 and M2. This position, along with other data or voice traffic, can then be relayed from reference relay impulse radio units R2 -R4 back to the reference master impulse radio unit R1 or the central station 930.

The reference impulse radio units R1–R4 used in this architecture are impulse radio two-way transceivers, the electronic monitors M1 and M2 are one-way transmitters. The firmware in the radios varies slightly based on the functions each radio must perform. For example, the reference master impulse radio unit R1 is designated to direct the passing of information, and typically is responsible for collecting all the data for external graphical display at the central station 930. The remaining reference relay impulse radio units R2–R4 contain a separate version of the firmware, the primary difference being the different parameters or information that each reference relay impulse radio unit R2–R4 must provide the network. Finally, the electronic monitors M1 and M2 have their own firmware version that transmits pulses in predetermined sequences.

Each reference radio link is a two-way link that allows for the passing of information, data and/or voice. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other radios transmit in their assigned transmit time slots, the entire group of reference impulse radio units R1–R4 within the network are able to synchronize themselves. The oscillators used on the impulse radio boards drift slowly in time, thus they may require monitoring and adjustment to maintain synchronization. The accuracy of this synchronization process (timing) is dependent upon several factors including, for example, how often and how long each radio transmits along with other factors. The electronic monitors M1 and M2, since they are transmit-only transmitters, are not time-synchronized to the synchronized reference impulse radio units R1–R4.

The purpose of the impulse radio positioning network is to enable the tracking of electronic monitors M1 and M2. Tracking is accomplished by stepping through several well-defined steps. The first step is for the reference impulse radio units R1–R4 to synchronize together and begin passing information. Then, when a electronic monitor M1 or M2 enters the network area and begins to transmit pulses, the reference impulse radio units R1–R4 pick up these pulses as time-of-arrivals (TOAs). Multiple TOAs collected by different synchronized reference impulse radio units R1–R4 are then converted to ranges, which are then used to calculate the XYZ position of the electronic monitor M1 or M2 in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the reference impulse radio units R1–R4 forwards their position calculation to the central station 930 for storage and real-time display.

Unsynchronized Transmitter Tracking Architecture

Figure 17:
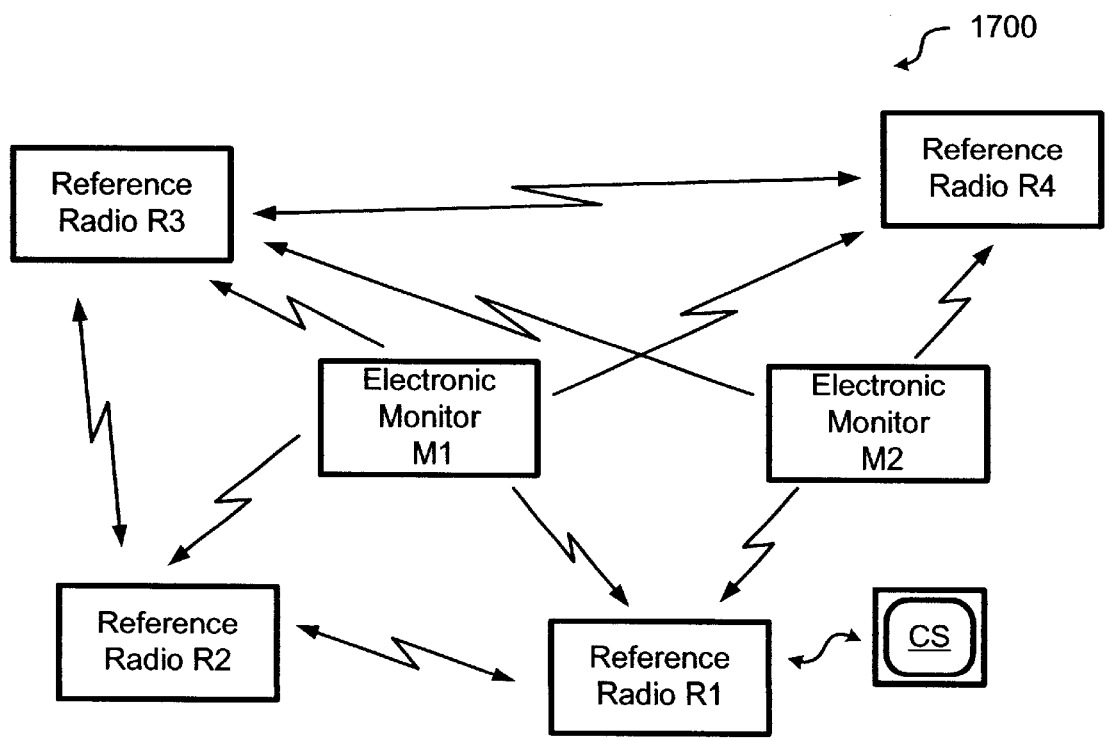
FIG. 17 is a block diagram of an impulse radio positioning network utilizing an unsynchronized transmitter tracking architecture that can be used in the present invention.

Referring to FIG. 17, there is illustrated a block diagram of an impulse radio positioning network 1700 utilizing an unsynchronized transmitter tracking architecture. This architecture is very similar to the synchronized transmitter tracking architecture except that the reference impulse radio units R1–R4 are not synchronized in time. In other words, both the reference impulse radio units R1–R4 and the electronic monitors M1 and M2 are free-running. The network is designed to be scalable, allowing from very few electronic monitors M1 and M2 and reference impulse radio units R1–R4 to a very large number. This architecture is especially applicable to an "RF tag" (radio frequency tag) type of application.

This particular example of the unsynchronized transmitter tracking architecture shows a network 1700 of four reference impulse radio units R1–R4 and two electronic monitors M1 and M2. The arrows between the radios represent two-way and one-way data and/or voice links. Notice that the electronic monitors M1 and M2 only transmit, thus they do not receive the transmissions from the other radios. Unlike the synchronous transmitter tracking architecture, the reference impulse radio units R1–R4 in this architecture are free-running (unsynchronized). There are several ways to implement this design, the most common involves relaying the time-of-arrival (TOA) pulses from the electronic monitors M1 and M2 and reference impulse radio units R1–R4, as received at the reference impulse radio units R1–R4, back to the reference master impulse radio unit R1 which communicates with the central station 930.

Each reference impulse radio unit R1–R4 in this architecture is a two-way impulse radio transceiver; thus each link between reference impulse radio unit R1–R4 can be either two-way (duplex) or one-way (simplex). TOA information is typically transmitted from the reference impulse radio units R1–R4 back to the reference master impulse radio unit R1 where the TOAs are converted to ranges and then an XYZ position of the electronic monitor M1 or M2, which can then be forwarded and displayed at the central station 930.

The reference impulse radio units R1–R4 used in this architecture are impulse radio two-way transceivers, the electronic monitors M1 and M2 are one-way impulse radio transmitters. The firmware in the radios varies slightly based on the functions each radio must perform. For example, the reference master impulse radio R1 collects the TOA information, and is typically responsible for forwarding this tracking data to the central station 930. The remaining reference relay impulse radio units R2–R4 contain a separate version of the firmware, the primary difference being the different parameters or information that each reference relay impulse radio units R2–R4 must provide the network. Finally, the electronic monitors M1 and M2 have their own firmware version that transmits pulses in predetermined sequences.

Each reference radio link is a two-way link that allows for the passing of information, data and/or voice. The data-rates between each radio link is a function of several variables including the number of pulses integrated to get a single bit, the number of bits per data parameter, the length of any headers required in the messages, the range bin size, and the number of radios in the network.

Since the reference impulse radio units R1–R4 and electronic monitors M1 and M2 are free-running, synchronization is actually done by the reference master impulse radio unit R1. The oscillators used in the impulse radios drift slowly in time, thus they may require monitoring and adjustment to maintain synchronization at the reference master impulse radio unit R1. The accuracy of this synchronization (timing) is dependent upon several factors including, for example, how often and how long each radio transmits along with other factors.

The purpose of the impulse radio positioning network is to enable the tracking of electronic monitors M1 and M2. Tracking is accomplished by stepping through several steps. The most likely method is to have each reference impulse radio unit R1–R4 periodically (randomly) transmit a pulse sequence. Then, when a electronic monitor M1 or M2 enters the network area and begins to transmit pulses, the reference impulse radio units R1–R4 pick up these pulses as time-of-arrivals (TOAs) as well as the pulses (TOAs) transmitted by the other reference radios. TOAs can then either be relayed back to the reference master impulse radio unit R1 or just collected directly (assuming it can pick up all the transmissions). The reference master impulse radio unit R1 then converts these TOAs to ranges, which are then used to calculate the XYZ position of the electronic monitor M1 or M2. If the situation warrants and the conversion possible, the XYZ position can be converted to any one of the worldwide coordinates such as Earth Centered Inertial (ECI), Earth Centered Earth Fixed (ECEF), or J2000 (inertial coordinates fixed to year 2000). Finally, the reference master impulse radio unit R1 forwards its position calculation to the central station 930 for storage and real-time display.

Synchronized Receiver Tracking Architecture

Figure 18:
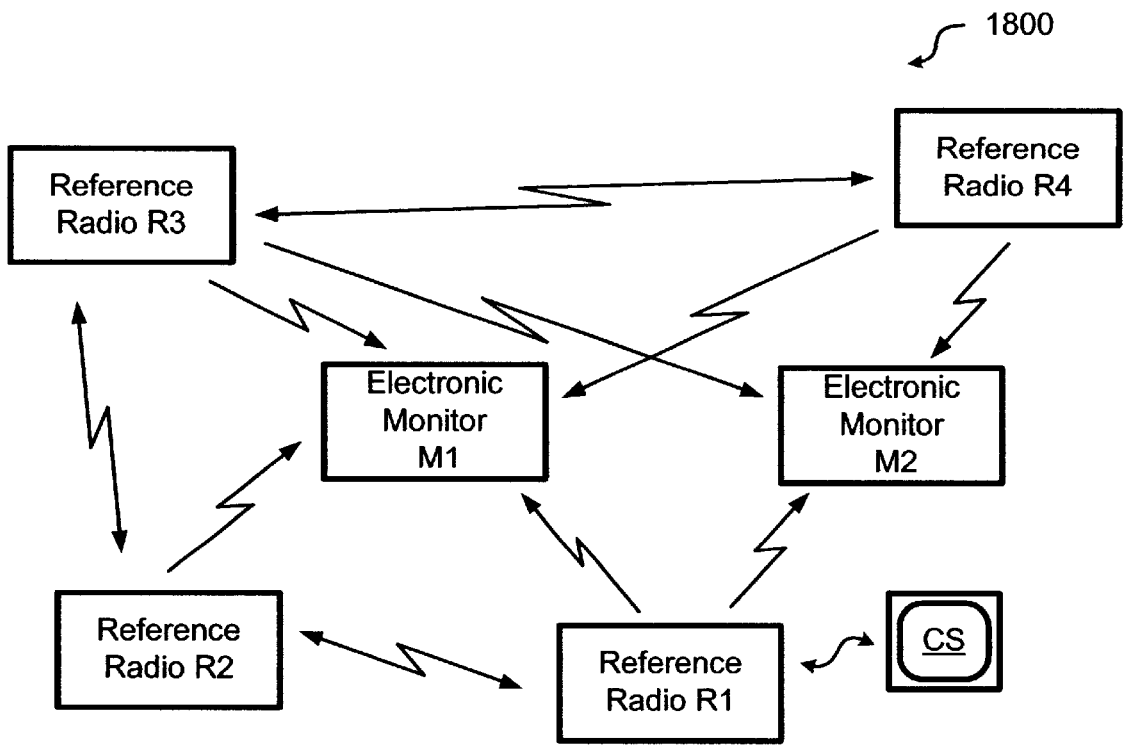
FIG. 18 is a block diagram of an impulse radio positioning network utilizing a synchronized receiver tracking architecture that can be used in the present invention.

Referring to FIG. 18, there is illustrated a block diagram of an impulse radio positioning network 1800 utilizing a synchronized receiver tracking architecture. This architecture is different from the synchronized transmitter tracking architecture in that in this design the electronic monitors M1 and M2 determine their positions but are not able to broadcast it to anyone since they are receive-only radios. The network is designed to be scalable, allowing from very few electronic monitors M1 and M2 and reference impulse radio units R1–R4 to a very large number.

This particular example of the synchronized receiver tracking architecture shows a network 1800 of four reference impulse radio units R1–R4 and two electronic monitors M1 and M2. The arrows between the radios represent two-way and one-way data and/or voice links. Notice that the electronic monitors M1 and M2 receive transmissions from other radios, and do not transmit.

Each reference impulse radio unit R1–R4 is a two-way transceiver, and each electronic monitor M1 and M2 is a receive-only radio. Precise, synchronized pulses are transmitted by the reference network and received by the reference impulse radio units R1–R4 and the electronic monitors M1 and M2. The electronic monitors M1 and M2 take these times-of-arrival (TOA) pulses, convert them to ranges, then determine their XYZ positions. Since the electronic monitors M1 and M2 do not transmit, only they themselves know their XYZ positions.

The reference impulse radio units R1–R4 used in this architecture are impulse radio two-way transceivers, the electronic monitors M1 and M2 are receive-only radios. The firmware for the radios varies slightly based on the functions each radio must perform. For example, the reference master impulse radio unit R1 is designated to direct the synchronization of the reference radio network. The remaining reference relay impulse radio units R2–R4 contain a separate version of the firmware, the primary difference being the different parameters or information that each reference relay impulse radio unit R2–R4 must provide the network. Finally, the electronic monitors M1 and M2 have their own firmware version that calculates their position and displays it locally if desired.

Each reference radio link is a two-way link that allows for the passing of information, data and/or voice. The electronic monitors M1 and M2 are receive-only. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other reference impulse radio units R1–R4 transmit in their assigned transmit time slots, the entire group of reference impulse radio units R1–R4 within the network are able to synchronize themselves. The oscillators used on the impulse radio boards may drift slowly in time, thus they may require monitoring and adjustment to maintain synchronization. The accuracy of this synchronization (timing) is dependent upon several factors including, for example, how often and how long each radio transmits along with other factors.

The purpose of the impulse radio positioning network is to enable the tracking of electronic monitors M1 and M2. Tracking is accomplished by stepping through several well-defined steps. The first step is for the reference impulse radio units R1–R4 to synchronize together and begin passing information. Then, when an electronic monitor M1 or M2 enters the network area, it begins receiving the time-of-arrival (TOA) pulses from the reference radio network. These TOA pulses are converted to ranges, then the ranges are used to determine the XYZ position of the electronic monitor M1 or M2 in local coordinates using a least squares-based estimator. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000).

Unsynchronized Receiver Tracking Architecture

Figure 19:
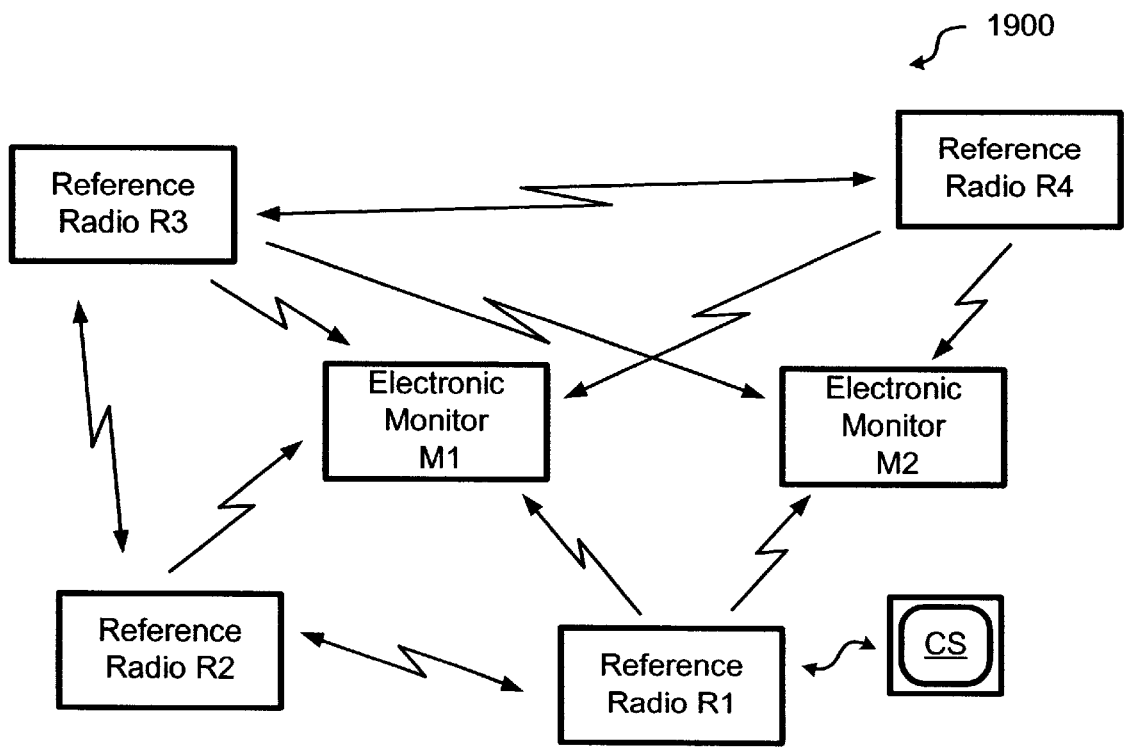
FIG. 19 is a block diagram of an impulse radio positioning network utilizing an unsynchronized receiver tracking architecture that can be used in the present invention.

Referring to FIG. 19, there is illustrated a block diagram of an impulse radio positioning network 1900 utilizing an unsynchronized receiver tracking architecture. This architecture is different from the synchronized receiver tracking architecture in that in this design the reference impulse radio units R1–R4 are not time-synchronized. Similar to the synchronized receiver tracking architecture, electronic monitors M1 and M2 determine their positions but cannot broadcast them to anyone since they are receive-only radios. The network is designed to be scalable, allowing from very few electronic monitors M1 and M2 and reference impulse radio units R1–R4 to a very large number.

This particular example of the unsynchronized receiver tracking architecture shows a network 1900 of four reference impulse radio units R1–R4 and two electronic monitors M1 and M2. The arrows between the radios represent two-way and one-way data and/or voice links. Notice that the electronic monitors M1 and M2 only receive transmissions from other radios, and do not transmit.

Each reference impulse radio unit R1–R4 is an impulse radio two-way transceiver, each electronic monitor M1 and M2 is a receive-only impulse radio. Precise, unsynchronized pulses are transmitted by the reference network and received by the other reference impulse radio units R1–R4 and the electronic monitors M1 and M2. The electronic monitors M1 and M2 take these times-of-arrival (TOA) pulses, convert them to ranges, and then determine their XYZ positions. Since the electronic monitors M1 and M2 do not transmit, only they themselves know their XYZ positions.

The reference impulse radio units R1–R4 used in this architecture are impulse radio two-way transceivers, the electronic monitors M1 and M2 are receive-only radios. The firmware for the radios varies slightly based on the functions each radio must perform. For this design, the reference master impulse radio unit R1 may be used to provide some synchronization information to the electronic monitors M1 and M2. The electronic monitors M1 and M2 know the XYZ position for each reference impulse radio unit R1–R4 and as such they may do all of the synchronization internally.

The data-rates between each radio link is a function of several variables including the number of pulses integrated to get a single bit, the number of bits per data parameter, the length of any headers required in the messages, the range bin size, and the number of impulse radios in the network.

For this architecture, the reference impulse radio units R1–R4 transmit in a free-running (unsynchronized) manner. The oscillators used on the impulse radio boards often drift slowly in time, thus requiring monitoring and adjustment of synchronization by the reference master impulse radio unit R1 or the electronic monitors M1 and M2 (whomever is doing the synchronization). The accuracy of this synchronization (timing) is dependent upon several factors including, for example, how often and how long each radio transmits.

The purpose of the impulse radio positioning network is to enable the tracking electronic monitors M1 and M2. Tracking is accomplished by stepping through several steps. The first step is for the reference impulse radio units R1–R4 to begin transmitting pulses in a free-running (random) manner. Then, when a electronic monitor M1 or M2 enters the network area, it begins receiving the time-of-arrival (TOA) pulses from the reference radio network. These TOA pulses are converted to ranges, then the ranges are used to determine the XYZ position of the electronic monitor M1 or M2 in local coordinates using a least squares-based estimator. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000).

Mixed Mode Tracking Architecture

For ease of reference, in FIGS. 20–25 the below legend applies.

| Symbols and Definitions | |
|---|---|
| ● | Receiver Radio (receive only) |
| X | Transmitter Radio (transmit only) |
| ✕ | Transceiver Radio (receive and transmit) |
| $R_i$ | Reference Radio (fixed location) |
| $M_i$ | Mobile Radio (radio being tracked) |
| ⇅ | Duplex Radio Link |
| ↘ | Simplex Radio Link |
| TOA, DTOA | Time of Arrival, Differenced TOA |

Figure 20:
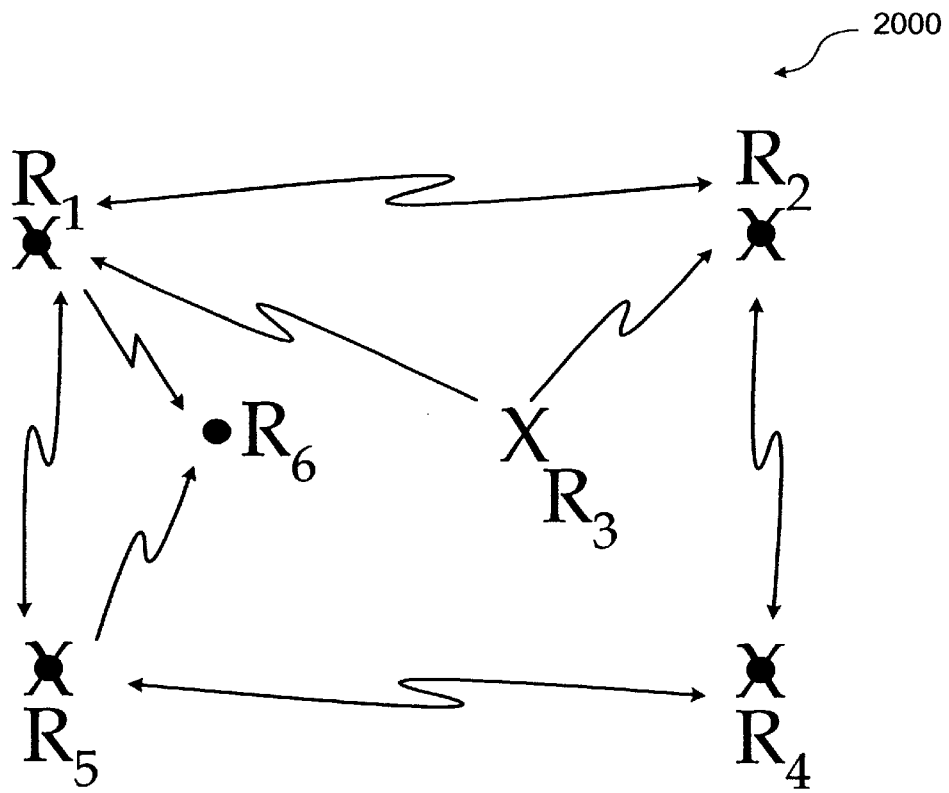
FIG. 20 is a diagram of an impulse radio positioning network utilizing a mixed mode reference radio tracking architecture that can be used in the present invention.

Referring to FIG. 20, there is illustrated a diagram of an impulse radio positioning network 2000 utilizing a mixed mode reference radio tracking architecture. This architecture defines a network of reference impulse radio units R1–R6 comprised of any combination of transceivers ($R_1$, $R_2$, $R_4$, $R_5$), transmitters ($R_3$), and receivers ($R_6$). Electronic monitors (none shown) entering this mixed-mode reference network use whatever reference radios are appropriate to determine their positions.

Figure 21:
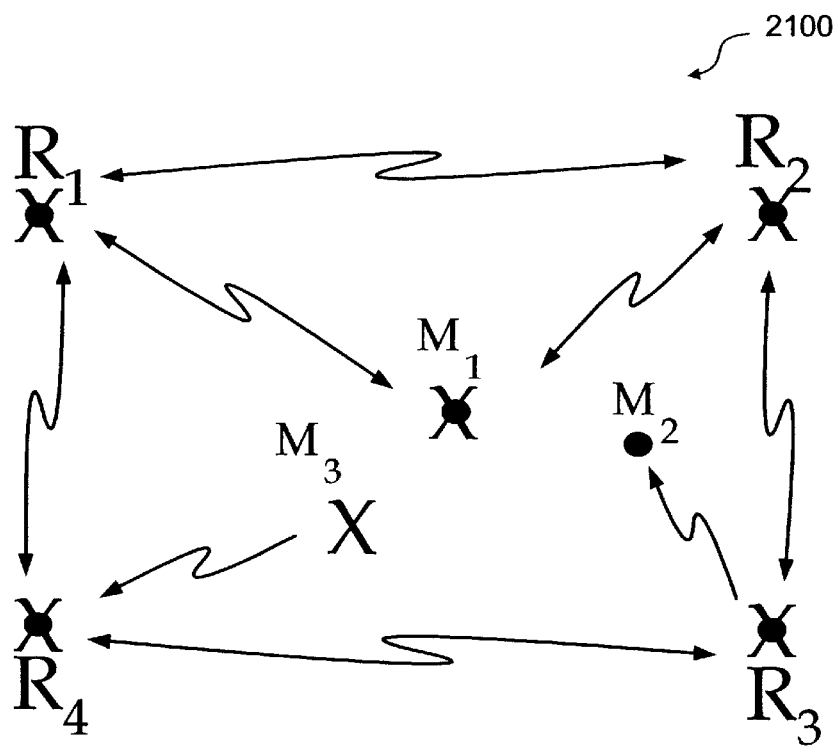
FIG. 21 is a diagram of an impulse radio positioning network utilizing a mixed mode mobile apparatus tracking architecture that can be used in the present invention.

Referring to FIG. 21, there is a diagram of an impulse radio positioning network 2100 utilizing a mixed mode mobile apparatus tracking architecture. Herein, the electronic monitors M1–M3 are mixed mode and reference impulse radio units R1–R4 are likely time-synched. In this illustrative example, the electronic monitor M1 is a transceiver, electronic monitor M2 is a transmitter, and electronic monitor M3 is a receiver. The reference impulse radio units R1–R4 can interact with different types of electronic monitors M1–M3 to help in the determination of the positions of the mobile apparatuses.

Antennae Architectures

Figure 22:
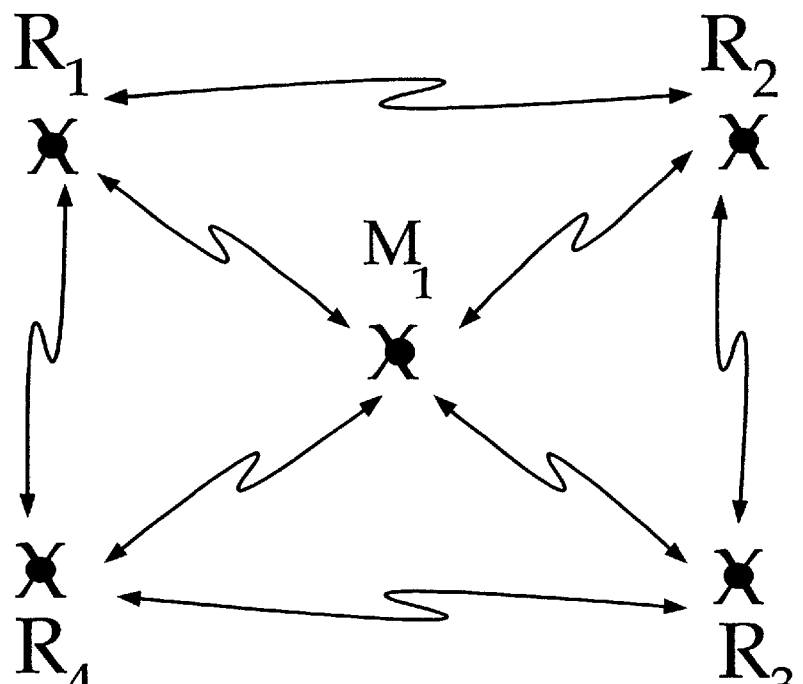
FIG. 22 is a diagram of a steerable null antennae architecture capable of being used in an impulse radio positioning network in accordance the present invention.

Referring to FIG. 22, there is illustrated a diagram of a steerable null antennae architecture capable of being used in an impulse radio positioning network. The aforementioned impulse radio positioning networks can implement and use steerable null antennae to help improve the impulse radio distance calculations. For instance, all of the reference impulse radio units R1–R4 or some of them can utilize steerable null antenna designs to direct the impulse propagation; with one important advantage being the possibility of using fewer reference impulse radio units or improving range and power requirements. The electronic monitor M1 can also incorporate and use a steerable null antenna.

Figure 23:
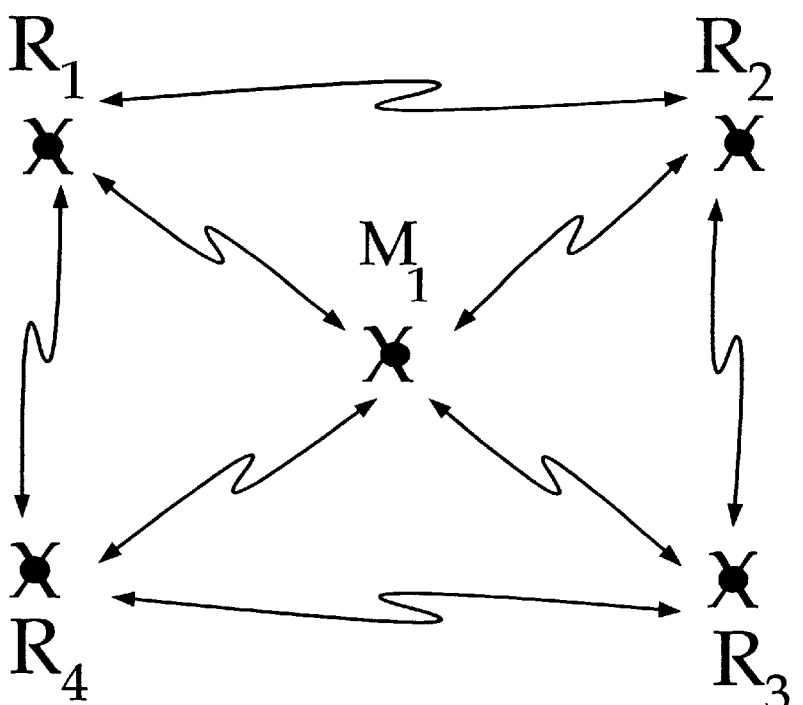
FIG. 23 is a diagram of a specialized difference antennae architecture capable of being used in an impulse radio positioning network in accordance the present invention.

Referring to FIG. 23, there is illustrated a diagram of a specialized difference antennae architecture capable of being used in an impulse radio positioning network. The reference impulse radio units R1–R4 of this architecture may use a difference antenna analogous to the phase difference antenna used in GPS carrier phase surveying. The reference impulse radio units R1–R4 should be time synched and the electronic monitor M1 should be able to transmit and receive.

Figure 24:
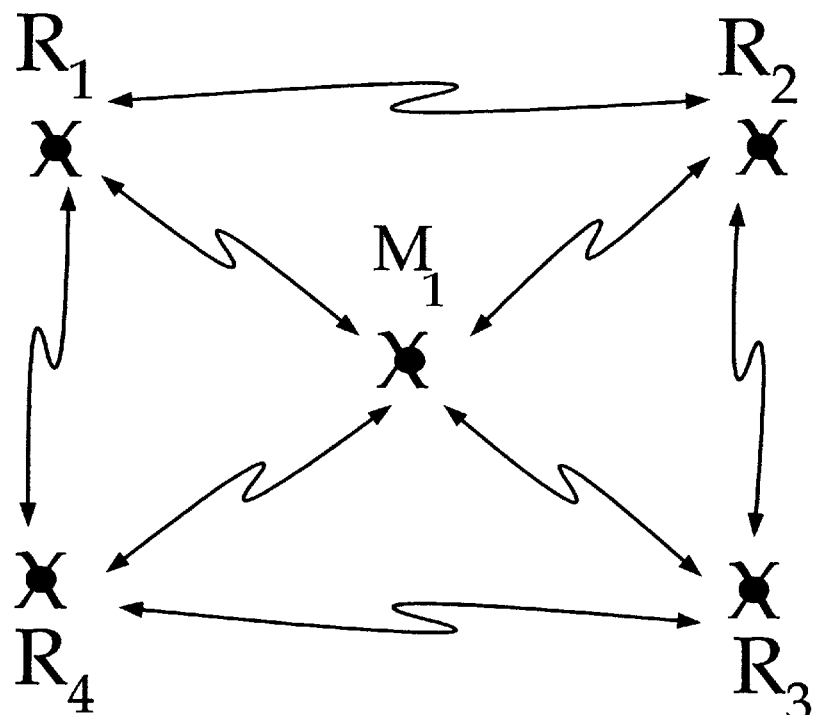
FIG. 24 is a diagram of a specialized directional antennae architecture capable of being used in an impulse radio positioning network in accordance with the present invention.

Referring to FIG. 24, there is illustrated a diagram of a specialized directional antennae architecture capable of being used in an impulse radio positioning network. As with the steerable null antennae design, the implementation of this architecture is often driven by design requirements. The reference impulse radio units R1–R4 and the mobile apparatus A1 can incorporate a directional antennae. In addition, the reference impulse radio units R1–R4 are likely time-synched.

Figure 25:
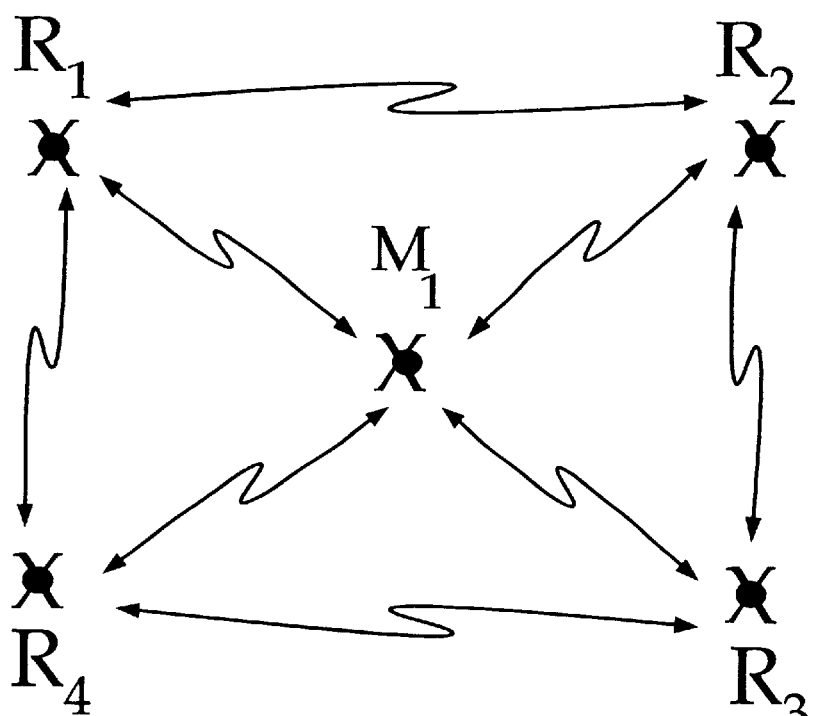
FIG. 25 is a diagram of an amplitude sensing architecture capable of being used in an impulse radio positioning network in accordance with the present invention.

Referring to FIG. 25, there is illustrated a diagram of an amplitude sensing architecture capable of being used in an impulse radio positioning network. Herein, the reference impulse radio units R1–R4 are likely time-synched. Instead of the electronic monitor M1 and reference impulse radio units R1–R2 measuring range using TOA methods (round-trip pulse intervals), signal amplitude is used to determine range. Several implementations can be used such as measuring the "absolute" amplitude and using a pre-defined look up table that relates range to "amplitude" amplitude, or "relative" amplitude where pulse amplitudes from separate radios are differenced. Again, it should be noted that in this, as all architectures, the number of radios is for illustrative purposes only and more than one mobile impulse radio can be implemented in the present architecture.

From the foregoing, it can be readily appreciated by those skilled in the art that the present invention provides a system, electronic monitor and method that utilize impulse radio technology to enable a farmer to accurately track a position of an object (e.g., farm equipment, farm animal, farm employee) as the object moves around a farm and/or to enable a farmer to monitor a variety of parameters of the moving farm equipment. In addition, the system, electronic monitor and method can utilize impulse radio technology to help control either remotely or automatically one or more pieces of farm equipment.

Although various embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method for tracking an object located on a farm, said method comprising the steps of:

attaching, to the object, an ultra wideband impulse radio unit;

determining a position of the object from the interaction between the ultra wideband impulse radio unit and at least two of a plurality of reference ultra wideband impulse radio units distributed at known locations throughout the farm;

receiving, at a central station, information relating to the position of the object;

displaying, at the central station, an overlay of the farm that indicates the position of the object; and using the ultra wideband impulse radio unit and another ultra wideband impulse radio unit at the central station to establish two-way communications between a person at the central station and a person that is the object or is associated with the object, wherein the ultra wideband impulse radio unit is used to determine the position of the object and to establish the two-way communications between the person at the central station and the person that is the object or is associated with the object.

2. The method of claim 1, wherein the object is a farm animal.

3. The method of claim 1, wherein the object is a farm employee.

4. The method of claim 1, wherein the object is a piece of farm equipment.

5. The method of claim 4, further comprising the step of using the determined position of the farm equipment to automatically operate the farm equipment.

6. The method of claim 5, further comprising the step of automatically steering the farm equipment along a crop line on the farm.

7. The method of claim 4, further comprising the step of using the determined position of the farm equipment to automatically control the farm equipment to distribute fertilizer.

8. The method of claim 4, further comprising the step of using the determined position of the farm equipment to automatically control the farm equipment to distribute seeds.

9. The method of claim 4, further comprising the step of using the determined position of the farm equipment to automatically control the farm equipment to distribute insecticide.

10. The method of claim 4, further comprising the step of using the determined position of the farm equipment to automatically control the farm equipment to irrigate the farm.

11. The method of claim 4, further comprising the step of coupling a controller to the ultra wideband impulse radio unit, wherein the controller interacts with a plurality of sensors that monitor at least one of the farm equipment.

12. A system for tracking an object located on a farm, said system comprising:
  an ultra wideband impulse radio unit attached to the object;
  a plurality of reference ultra wideband impulse radio units distributed at known locations throughout the farm at least two of which interact with the ultra wideband impulse radio unit to enable the determination of the position of the object;
  a central station capable of receiving information relating to the position of the object;
  said central station capable of displaying an overlay of the farm that indicates the position of the object; and
  said central station including an ultra wideband impulse radio unit that interacts with the ultra wideband impulse radio unit attached to the object to establish two-way communications between a person at the central station and a person that is the object or is associated with the object, wherein the ultra wideband impulse radio unit attached to the object is used to determine the position of the object and to establish the two-way communications between the person at the central station and the person that is the object or is associated with the object.

13. The system of claim 12, wherein the object is a farm animal.

14. The system of claim 12, wherein the object is a farm employee.

15. The system of claim 14, wherein the object is a piece of farm equipment.

16. The system of claim 15, wherein said central station knowing the position of the farm equipment is further capable of automatically operating the farm equipment.

17. The system of claim 16, wherein said central station is further capable of automatically steering the farm equipment along a crop line on the farm.

18. The system of claim 15, wherein said central station knowing the position of the farm equipment is further capable of automatically controlling the farm equipment to distribute fertilizer.

19. The system of claim 15, wherein said central station knowing the position of the farm equipment is further capable of automatically controlling the farm equipment to distribute seeds.

20. The system of claim 15, wherein said central station knowing the position of the farm equipment is further capable of automatically controlling the farm equipment to distribute insecticide.

21. The system of claim 15, wherein said central station knowing the position of the farm equipment is further capable of automatically controlling the farm equipment to irrigate the farm.

22. The system of claim 15, further comprising a controller, coupled to the ultra wideband impulse radio unit, capable of interacting with a plurality of sensors that monitor at least one parameter of the farm equipment.

23. An electronic monitor comprising:
  an ultra wideband impulse radio unit, attached to an object, capable of transmitting an impulse radio signal containing information to a central station that enables a person to track a position of the object moving on a farm, where the position of the object is determined from the interaction between the ultra wideband impulse radio unit and at least two of a plurality of reference ultra wideband impulse radio units distributed at known locations throughout the farm; and
  said ultra wideband impulse radio unit is further capable of interacting with an ultra wideband impulse radio unit at the central station to establish two-way communications between a person at the central station and a person that is the object or is associated with the object, wherein the ultra wideband impulse radio unit attached to the object is used to determine the position of the object and to establish the two-way communications between the person at the central station and the person that is the object or is associated with the object.

24. The electronic monitor of claim 23, wherein the object is a farm employee.

25. The electronic monitor of claim 23, wherein the object is a farm animal.

26. The electronic monitor of claim 23, wherein the object is a piece of farm equipment.

27. The electronic monitor of claim 26, further comprising a controller, coupled to the ultra wideband impulse radio unit, capable of interacting with a plurality of sensors that monitor at least one parameter of the farm equipment.

28. The electronic monitor of claim 26, further comprising a display capable of displaying an overlay of the farm that indicates the position of the moving farm equipment and the at least one monitored parameter.

29. A method for tracking and monitoring a piece of farm equipment located on a farm, said method comprising the steps of:
  attaching, to the farm equipment, an ultra wideband impulse radio unit;
  receiving, at a central station, information from the ultra wideband impulse radio unit relating to the farm equipment;
  displaying, at the central station, at least a portion of the information relating to the farm equipment;
  determining a current position of the farm equipment by enabling the ultra wideband impulse radio unit to interact with a plurality of reference ultra wideband impulse radio units that are distributed at known locations around the farm by performing the following steps:
    synchronizing the reference ultra wideband impulse radio units;

synchronizing the ultra wideband impulse radio unit to the synchronized reference ultra wideband impulse radio units;

collecting and time-tagging range measurements between the ultra wideband impulse radio unit and at least two of the reference ultra wideband impulse radio units; and calculating the position of the farm equipment carrying the electronic monitor containing the ultra wideband impulse radio unit using the collected and time-tagged range measurements;

displaying, at the central station, the current position of the farm equipment; and using the ultra wideband impulse radio unit and another ultra wideband impulse radio unit at the central station to establish two-way communications between a person at the central station and a person operating the farm equipment, wherein the ultra wideband impulse radio unit is used to determine the position of the farm equipment and to establish the two-way communications between the person at the central station and the person operating the farm equipment.

30. The method of claim 29, wherein the information relating to the farm equipment includes at least one monitored parameter.

31. The method of claim 30, wherein said step of displaying further includes indicating an alarm whenever one of the at least one monitored parameters exceeds a predetermined threshold.

32. The method of claim 29, further comprising the step of using the determined position of the farm equipment to automatically control the farm equipment in accordance with an agronomic plan.

33. The method of claim 29, further comprising the step of monitoring soil conditions.

34. The method of claim 29, further comprising the step of monitoring crop conditions.

35. A system comprising:

an electronic monitor, attached to a piece of farm equipment, including an ultra wideband impulse radio unit capable of transmitting an impulse radio signal containing information relating to the farm equipment;

a central station capable of obtaining the information and further capable of displaying at least a portion of the information relating to the farm equipment;

a plurality of reference ultra wideband impulse radio units distributed at known locations throughout the farm at least two of which interact with the ultra wideband impulse radio unit to enable the determination of the position of the farm equipment by performing the following steps:

synchronizing the reference ultra wideband impulse radio units;

synchronizing the ultra wideband impulse radio unit to the synchronized reference ultra wideband impulse radio units;

collecting and time-tagging range measurements between the ultra wideband impulse radio unit and at least two of the reference ultra wideband impulse radio units; and calculating the position of the farm equipment carrying the electronic monitor containing the ultra wideband impulse radio unit using the collected and time-tagged range measurements;

said central station capable of displaying an overlay of the farm that indicates the position of the farm equipment; and said central station including an ultra wideband impulse radio unit that interacts with the ultra wideband impulse radio unit attached to the farm equipment to establish two-way communications between a person at the central station and a person operating the farm equipment, wherein the ultra wideband impulse radio unit is used to determine the position of the farm equipment and to establish the two-way communications between the person at the central station and the person operating the farm equipment.

36. The system of claim 35, wherein the information relating to the farm equipment includes at least one monitored parameter.

37. The system of claim 36, wherein said central station is further capable of indicating an alarm whenever one of the at least one monitored parameters exceeds a predetermined threshold.

38. The system of claim 35, wherein said central station knowing a position of the farm equipment is further capable of automatically controlling the farm equipment in accordance with an agronomic plan.

39. The system of claim 35, further comprising at least one sensor capable of monitoring soil conditions.

40. The system of claim 35, further comprising at least one sensor capable of monitoring crop conditions.

41. An electronic monitor comprising:

a controller operable to monitor at least one parameter of a piece of farm equipment;

an ultra wideband impulse radio unit operable to interact with said controller such that a person can view at a central station the at least one monitored parameter;

said ultra wideband impulse radio unit is capable of interacting with at least two of a plurality of reference ultra wideband impulse radio units distributed at known locations throughout a farm to enable a determination of a position of the farm equipment by performing the following steps:

synchronizing the reference ultra wideband impulse radio units;

synchronizing the ultra wideband impulse radio unit to the synchronized reference ultra wideband impulse radio units;

collecting and time-tagging range measurements between the ultra wideband impulse radio unit and at least two of the reference ultra wideband impulse radio units; and calculating the position of the farm equipment using the collected and time-tagged range measurements; and said ultra wideband impulse radio unit is further capable of interacting with another ultra wideband impulse radio unit at the central station to establish two-way communications between a person at the central station and a person operating the farm equipment, wherein the ultra wideband impulse radio unit is used to determine the position of the object and to establish the two-way communications between the person at the central station and the person operating the farm equipment.

42. A method for managing a farm, said method comprising the steps of:

obtaining farm related information using ultra wideband impulse radio technology, wherein said step of obtaining farm related information further includes:

determining a current position of an object carrying an ultra wideband impulse radio unit by enabling the ultra wideband impulse radio unit to interact with a plurality of reference ultra wideband impulse radio units that are distributed at known locations around the farm; and using the ultra wideband impulse radio unit and another ultra wideband impulse radio unit at a central station to establish two-way communications between a person at the central station and a person that is the object or is associated with the object, wherein the ultra wideband impulse radio unit is used to determine the position of the object and to establish the two-way communications between the person at the central station and the person that is the object or is associated with the object.

43. The method of claim 42, wherein said step of obtaining the farm related information includes:

monitoring soil conditions and crop conditions on the farm.

44. The method of claim 42, wherein the object is a farm animal.

45. The method of claim 42, wherein the object is a farm employee.

46. The method of claim 42, wherein the object is a piece of farm equipment.

47. The method of claim 42, wherein said step of using the farm related information to increase the profitability of the farm includes:

automatically controlling the piece of farm equipment in accordance with the determined position and an agronomic plan.

48. The method of claim 47, wherein the piece of farm equipment can be automatically controlled to distribute fertilizer, seeds, water or insecticides.

* * * * *